(12) United States Patent
Oba

(10) Patent No.: US 11,735,780 B2
(45) Date of Patent: Aug. 22, 2023

(54) METAL NEGATIVE ELECTRODE ULTRASONIC CHARGING

(71) Applicant: QUANTUMSCAPE CORPORATION, San Jose, CA (US)

(72) Inventor: Hiro Oba, San Jose, CA (US)

(73) Assignee: QUANTUMSCAPE BATTERY, INC., San Jose, CA (US)

(*) Notice: Subject to any disclaimer, the term of this patent is extended or adjusted under 35 U.S.C. 154(b) by 546 days.

(21) Appl. No.: 16/491,525

(22) PCT Filed: Mar. 9, 2018

(86) PCT No.: PCT/US2018/021833
§ 371 (c)(1),
(2) Date: Sep. 5, 2019

(87) PCT Pub. No.: WO2018/165606
PCT Pub. Date: Sep. 13, 2018

(65) Prior Publication Data
US 2020/0020990 A1    Jan. 16, 2020

Related U.S. Application Data

(60) Provisional application No. 62/470,069, filed on Mar. 10, 2017.

(51) Int. Cl.
*H01M 10/00* (2006.01)
*H01M 10/42* (2006.01)
(Continued)

(52) U.S. Cl.
CPC ... *H01M 10/4214* (2013.01); *H01M 10/0562* (2013.01); *H01M 10/44* (2013.01);
(Continued)

(58) Field of Classification Search
CPC ......... H01M 10/4214; H01M 10/0562; H01M 10/44; H01M 2004/027; H01M 2220/20; H01M 2300/0068
See application file for complete search history.

(56) References Cited

U.S. PATENT DOCUMENTS 3,907,603 A * 9/1975 Kocherginsky ... H01M 10/4214
429/219
3,923,550 A * 12/1975 von Krusenstierna ......................
H01M 10/4214
429/229
(Continued)

FOREIGN PATENT DOCUMENTS

| CA | 2887227 A1 * | 4/2014 | ............ H01M 10/04 |
| CN | 1093202 A * | 10/1994 | ........ H01M 10/4214 |

(Continued)

OTHER PUBLICATIONS

Cussen, Edmund J. "Structure and ionic conductivity in lithium garnets", J. Mater. Chem., 2010, 20, pp. 5167-5173; DOI: 10.1039/b925553b.
(Continued)

*Primary Examiner* — Naum Levin
(74) *Attorney, Agent, or Firm* — Squire Patton Boggs (US)

(57) ABSTRACT

Systems and methods for using an ultrasonic vibration generator to apply vibrational energy to a metal negative electrode of a rechargeable battery. In some examples, the application of vibrational energy to the metal negative electrode occurs during a charging event.

4 Claims, 7 Drawing Sheets

(51) Int. Cl.
H01M 10/0562 (2010.01)
H01M 10/44 (2006.01)
H01M 4/02 (2006.01)

(52) U.S. Cl.
CPC .. *H01M 2004/027* (2013.01); *H01M 2220/20* (2013.01); *H01M 2300/0068* (2013.01)

(56) References Cited

U.S. PATENT DOCUMENTS

| | | | |
|---|---|---|---|
| 4,288,505 A | 9/1981 | Joshi et al. | |
| 4,668,593 A * | 5/1987 | Sammells | H01M 10/36 429/231.5 |
| 5,352,544 A * | 10/1994 | Kumar | H01M 10/052 429/312 |
| 5,436,548 A * | 7/1995 | Thomas | H01M 10/4214 320/147 |
| 5,614,332 A * | 3/1997 | Pavelle | H01M 10/42 429/69 |
| 5,629,599 A * | 5/1997 | Malaspina | H02J 7/02 320/137 |
| 5,932,991 A * | 8/1999 | Ahuja | H02J 7/0071 429/4 |
| 6,060,198 A * | 5/2000 | Snaper | H01M 4/80 429/233 |
| 6,733,924 B1 | 5/2004 | Skotheim et al. | |
| 8,697,292 B2 | 4/2014 | Kanno et al. | |
| 9,399,404 B2 * | 7/2016 | Ose | B60L 53/00 |
| 9,761,861 B1 | 9/2017 | Holme et al. | |
| 9,912,014 B2 * | 3/2018 | Herle | C04B 35/01 |
| 10,116,003 B2 | 10/2018 | Mayer et al. | |
| 10,205,155 B2 | 2/2019 | Holme | |
| 10,218,030 B2 * | 2/2019 | Iwasaki | B60L 50/64 |
| 10,270,125 B2 * | 4/2019 | Sasaki | H01M 10/0562 |
| 10,290,895 B2 * | 5/2019 | Holme | C04B 35/6262 |
| 10,559,820 B2 * | 2/2020 | Kishi | H01M 50/497 |
| 10,784,497 B2 | 9/2020 | Holme et al. | |
| 11,038,173 B2 * | 6/2021 | Umetsu | H01G 11/06 |
| 2003/0031931 A1 | 2/2003 | Obrovac et al. | |
| 2006/0147806 A1 | 7/2006 | Kugai et al. | |
| 2006/0222954 A1 | 10/2006 | Skotheim et al. | |
| 2006/0246355 A1 | 11/2006 | Min et al. | |
| 2007/0160911 A1 | 7/2007 | Senga et al. | |
| 2009/0226816 A1 | 9/2009 | Yoshida et al. | |
| 2009/0311567 A1 | 12/2009 | Visco et al. | |
| 2010/0279176 A1 | 11/2010 | Ogawa et al. | |
| 2011/0229765 A1 | 9/2011 | Barker et al. | |
| 2011/0259505 A1 | 10/2011 | Lee et al. | |
| 2011/0262816 A1 | 10/2011 | Amatucci | |
| 2011/0311875 A1 | 12/2011 | Lee et al. | |
| 2012/0094185 A1 | 4/2012 | Tsuchida et al. | |
| 2012/0196186 A1 | 8/2012 | Richard | |
| 2013/0017441 A1 | 1/2013 | Affinito et al. | |
| 2013/0034781 A1 * | 2/2013 | Khasin | H01M 12/06 977/773 |
| 2013/0040200 A1 | 2/2013 | Uetani et al. | |
| 2013/0040208 A1 | 2/2013 | Kanno et al. | |
| 2014/0054492 A1 | 2/2014 | Mukai et al. | |
| 2014/0072836 A1 * | 3/2014 | Mills | H01M 4/8626 429/422 |
| 2014/0117291 A1 | 5/2014 | Amatucci et al. | |
| 2014/0162138 A1 | 6/2014 | Fujiki et al. | |
| 2014/0170493 A1 | 6/2014 | Holme et al. | |
| 2014/0186708 A1 | 7/2014 | Pereira et al. | |
| 2014/0234715 A1 | 8/2014 | Fasching et al. | |
| 2014/0272564 A1 | 9/2014 | Holme et al. | |
| 2014/0363745 A1 | 12/2014 | Hirayama | |
| 2015/0017548 A1 | 1/2015 | Kato et al. | |
| 2015/0037687 A1 | 2/2015 | Kanno | |
| 2015/0056520 A1 | 2/2015 | Thokchom et al. | |
| 2015/0099188 A1 | 4/2015 | Holme et al. | |
| 2015/0333307 A1 | 11/2015 | Thokchom et al. | |
| 2016/0104891 A1 | 4/2016 | Holme | |
| 2016/0226032 A1 | 8/2016 | Oukassi et al. | |
| 2016/0380315 A1 | 12/2016 | Weicker et al. | |
| 2017/0005497 A1 * | 1/2017 | Sherstyuk | H01M 10/42 |
| 2017/0214084 A1 | 7/2017 | Cheng et al. | |
| 2017/0279155 A1 | 9/2017 | Sun et al. | |
| 2017/0324113 A1 | 11/2017 | Mayer et al. | |
| 2018/0198170 A1 | 7/2018 | Fujita et al. | |

FOREIGN PATENT DOCUMENTS

| | | | | |
|---|---|---|---|---|
| CN | 201508873 U | * | 6/2010 | |
| CN | 102324559 A | * | 1/2012 | |
| CN | 102983378 A | | 3/2013 | |
| CN | 103460469 A | * | 12/2013 | C25B 1/04 |
| CN | 103579707 A | | 2/2014 | |
| CN | 104541401 A | * | 4/2015 | B29C 65/02 |
| CN | 105008006 A | * | 10/2015 | A23G 9/224 |
| CN | 107170959 A | * | 9/2017 | B81B 7/02 |
| CN | 107863495 A | * | 3/2018 | B60L 50/64 |
| DE | 102009006128 A1 | * | 1/2010 | H01M 8/04126 |
| DE | 102009008988 A1 | * | 10/2010 | H01M 8/0271 |
| EP | 1639672 B1 | * | 12/2008 | H01M 10/06 |
| GB | 2064209 A | * | 6/1981 | H01M 10/44 |
| GB | 2333887 A | * | 8/1999 | H01M 10/4214 |
| JP | 57121172 A | * | 7/1982 | H01M 10/4214 |
| JP | H10241668 A | * | 9/1998 | |
| JP | 2000315505 A | * | 11/2000 | |
| JP | 2003123727 A | * | 4/2003 | |
| JP | 2006202680 A | * | 8/2006 | |
| JP | 2007273217 | | 10/2007 | |
| JP | 2009199936 A | * | 9/2009 | |
| JP | 2010102929 A | * | 5/2010 | |
| JP | 5255223 B2 | * | 8/2013 | |
| JP | 2015185483 A | * | 10/2015 | |
| JP | 2016533149 A | * | 10/2016 | |
| KR | 20130051039 A | * | 11/2011 | |
| KR | 20120054448 A | * | 5/2012 | |
| WO | WO 2011/118801 A1 | | 9/2011 | |
| WO | WO-2013140607 A1 | * | 9/2013 | B32B 18/00 |
| WO | WO 2014/186634 A2 | | 11/2014 | |
| WO | WO 2015/006144 A1 | | 1/2015 | |
| WO | WO 2015/054320 A2 | | 4/2015 | |
| WO | WO 2015/076944 A1 | | 5/2015 | |
| WO | WO 2015/130831 A1 | | 9/2015 | |
| WO | WO 2020/072524 A1 | | 4/2020 | |
| WO | WO/2020/176905 | | 9/2020 | |

OTHER PUBLICATIONS

Ahn et al., "Synthesis and Lithium Conductivities of $Li_2SiS_3$ and $Li_4SiS_4$," Mat. Res. Bull., 1989, vol. 24, pp. 889-897.

Andrews et al., "Infrared Spectra of P4S10 and its Decomposition Products in Solid Argon," Inorganic Chemistry, 1990, vol. 29, pp. 5222-5225.

Aotani et al., "Synthesis and electrochemical properties of lithium ion conductive glass, $Li_3PO_4$—$Li_2S$—$SiS_2$," Solid State Ionics, 1994, vol. 68, pp. 35-39.

Bartholomew et al., "Electrical properties of new glasses based on the $Li_2S$—$SiS_2$ system," Journal of Non-Crystalline Solids, 1999, vol. 256 & 257, pp. 242-247.

Chandrasekar, M.S., et al., "Pulse and pulse reverse plating—Conceptual, advantages and applications," Electrochimica Acta, 2008, vol. 53, pp. 3313-3322.

Creus et al., "The Use of Ionic and Mixed Conductive Glasses in Microbatteries," Materials Science and Engineering, 1989, B3, pp. 109-112.

Creus et al., "Thin films of ionic and mixed conductive glasses: their use in microdevices," Solid State Ionics, 1992, vol. 53-56, pp. 641-646.

Crowther, Owen et al., "Effect of Electrolyte Composition on Lithium Dendrite Growth," Journal of the Electrochemical Society, 2008, vol. 155, No. 11, pp. A806-A811.

Deiseroth et al., "$Li_6PS_5X$: A Class of Crystalline Li Rich Solids with an Unusually High Li+ Mobility," Angew. Chem. Int. Ed., 2008, vol. 47, pp. 755-758.

Ding, Fei et al., "Dendrite-Free Lithium Deposition via Self-Healing Electrostatic Shield Mechanism," J. Am. Chem. Soc., 2013, vol. 135, pp. 4450-4456.

(56) References Cited

OTHER PUBLICATIONS

Dini, Jack W., et al., "Electrodeposition of Copper," Chapter 2, Modern Electroplating, Fifth Edition, 2010, pp. 33-78.
Duluard et al., "Lithium conducting solid electrolyte $Li_{1.3}Al_{0.3}Ti_{1.7}(PO_4)_3$ obtained via solution chemistry," Journal of the European Ceramic Society, 2013, vol. 33, pp. 1145-1153.
Eckert et al., "Structural Transformation of Non-Oxide Chalcogenide Glasses. The Short-Range Order of $Li_2S$—$P_2S_5$ Glasses Studied by Quantitative $^{31}P$ and $^{6,7}Li$ High-Resolution Solid-State NMR," Chem. Mater., 1990, vol. 2, pp. 273-279.
Gireaud, L. et al., "Lithium metal stripping/plating mechanisms studies: A metallurgical approach," Electrochemistry Communications, 2006, vol. 8, pp. 1639-1649.
Hayashi et al., "Characterization of $Li_2S$—$P_2S_5$ glass-ceramics as a solid electrolyte for lithium secondary batteries," Solid State Ionics, 2004, vol. 175, pp. 683-686.
Hayashi et al., "Characterization of $Li_2S$—$SiS_2$—$Li_3MO_3$ (M=B, Al, Ga and In) oxysulfide glasses and their application to solid state lithium secondary batteries," Solid State Ionics, 2002, vol. 152-153, pp. 285-290.
Hayashi et al., "Development of sulfide glass-ceramic electrolytes for all-solid-state lithium rechargeable batteries," J. Solid State Electrochem, 2010, vol. 14, pp. 1761-1767.
Hayashi et al., "Formation of $Li^+$ superionic crystals from the $Li_2S$—$P_2S_5$ melt-quenched glasses," J. Mater Sci, 2008, vol. 43, pp. 1885-1889.
Hayashi et al., "Formation of superionic crystals from mechanically milled $Li_2S$—$P_2S_5$ glasses," Electrochemistry Communications, 2003, vol. 5, pp. 111-114.
Hayashi et al., "Improvement of chemical stability of $Li_3PS_4$ glass electrolytes by adding MxOy (M=Fe, Zn, and Bi) nanoparticles," Journal of Materials Chemistry A, 2013, vol. 1, pp. 6320-6326.
Hayashi et al., "Preparation of $Li_2S$—$P_2S_5$ Amorphous Solid Electrolytes by Mechanical Milling," Journal of the American Ceramic Society, 2001, vol. 84, pp. 477-479.
Hirai et al., "Thermal and electrical properties of rapidly quenched glasses in the systems $Li_2S$—$SiS_2$—$Li_xMO_y$, ($Li_xMO_y$=$Li_4SiO_4$, $Li_2SO_4$)," Solid State Ionics, 1995, vol. 78, pp. 269-273.
Hu et al., "Ionic Conductivity of Lithium Orthosilicate-Lithium Phosphate Solid Solutions," J. Electrochem. Soc., 1977, vol. 124, No. 8, pp. 1240-1242.
Jow, T.R. et al., "Interface Between Solid Anode and Solid Electrolyte-Effect of Pressure on Li/LiI ($Al_2O_3$) Interface," Solid Sate and Ionics 9 & 10, 1983, pp. 695-698.
Kaib et al., "New Lithium Chalcogenidotetrelates, LiChT: Synthesis and Characterization of the Li+—Conducting Tetralithium ortho-Sulfidostannate $Li_4SnS_4$," Chemistry of Materials, 2012, vol. 24, pp. 2211-2219.
Kamaya et al., "A lithium superionic conductor," Nature Materials, Sep. 2011, vol. 10, pp. 682-686; and Suplementary Information, DOI:10.1038/NMAT3066; 3 pages.
Kanamura, Kyoshi et al., "Electrochemical Deposition of Very Smooth Lithium Using Nonaqueous Electrolytes Containing HF," J. Electrochem. Soc., Jul. 1996, vol. 143, No. 7, pp. 2187-2197.
Kanno, "Lithium Ionic Conductor Thio-LISICON, the $Li_2S$—$GeS_2$-$P_2S_5$ System," Journal of the Electrochemical Society, 2001, vol. 148, pp. A742-A746.
Kanno, "Synthesis of a new lithium ionic conductor, thio-LISICON-lithium germanium sulfide system," Solid State Ionics, 2000, vol. 130, pp. 97-104.
Kennedy et al., "A Highly Conductive Li-Glass System: (1-x) ($0.4SiS_2$—$0.6Li_2S$)—xLiI," J. Electrochem. Soc., 1986, pp. 2437-2438.
Kim, Hansung, et al., "Preparation of PEM fuel cell electrodes using pulse electrodeposition," Journal of Power Sources, 2004, vol. 138, pp. 14-24.
Kobayashi et al., "Interfacial reactions at electrode/electrolyte boundary in all solid-state lithium battery using inorganic solid electrolyte, thio-LISICON," Electrochimica Acta, 2008, vol. 53, pp. 5045-5050.

Kondo et al., "New lithium ion conductors based on $Li_2S$—$SiS_2$ system," Solid State Ionics, 1992, vol. 53-56, pp. 1183-1186.
Leal-Gonzalez et al., "Structure of Lithium Sulfide, $LiGaS_2$," Acta. Cryst., 1990, C46, pp. 2017-2019.
Li et al., "An Artificial Solid Electrolyte Interphase Layer for Stable Lithium Metal Anodes," Adv. Mater., 2015, DOI: 10.1002/adma.201504526; pp. 1-6.
Liu et al., "Anomalous High Iconic Conductivity of Nanoporous $\beta$—$Li_3PS_4$," Journal of the American Chemical Society, 2012, dx.doi.org/10.1021/ja3110895; 4 pages.
Liu et al., "High performance $Li_2S$—$P_2S_5$ solid electrolyte induced by selenide," Journal of Power Sources, 2014, vol. 260, pp. 264-267.
Lu, Yingying et al., "Stable Lithium Electrodeposition in Liquid and Nanoporous Solid Electrolytes," School of Chemical and Biomolecular Engineering, Cornell University, Ithaca, New York, 2014, 30 pages.
Mayers, Matthew Z., "Suppression of dendrite formation via pulse charging in rechargeable lithium metal batteries", The Journal of Physical Chemistry, 2012, vol. 116, pp. 26214-26221.
Menetrier et al., "Iconic conduction in $B_2S_3$—$Li_2S$—LiI glasses," Solid State Ionics, 1992, vol. 53-56, pp. 1208-1213.
Mercier et al., "Superionic Conduction in $Li_2S$—$P_2S_5$—LiI-Glasses," Solid State Ionics, 1981, vol. 5, pp. 663-666.
Minami et al., "Electrical and electrochemical properties of glass-ceramic electrolytes in the systems $Li_2S$—$P_2S_5$—$P_2S_3$ and $Li_2S$—$P_2S_5$—$P_2O_5$", Solid State Ionics, 2011, vol. 192, pp. 122-125.
Minami et al., "Electrical and electrochemical properties of the $70Li_2S$ $(30-x)P_2S_5$ $xP_2O_5$ glass-ceramic electrolytes," Solid State Ionics, 2008, vol. 179, pp. 1282-1285.
Minami et al., "Lithium ion conductivity of the $Li_2S$—$P_2S_5$ glass-based electrolytes prepared by the melt quenching method," Solid State Ionics, 2007, vol. 178, pp. 837-841.
Minami et al., "Preparation and characterization of lithium ion-conducting oxysulfide glasses," Solid State Ionics, 2000, vol. 136-137, pp. 1015-1023.
Minami et al., "Recent progress of glass and glass-ceramics as solid electrolytes for lithium secondary batteries," Solid State Ionics, 2006, vol. 177, pp. 2715-2720.
Minami, "Fast Ion Conducting Glasses", Journal of Non-Crystalline Solids, 1985, vol. 73, pp. 273-284.
Mizuno et al., "All Solid-State Lithium Secondary Batteries Using High Lithium Ion Conducting $Li_2S$—$P_2S_5$ Glass-Ceramics", Chemistry Letters, 2002, pp. 1244-1245.
Mizuno et al., "High lithium ion conducting glass-ceramics in the system $Li_2S$—$P_2S_5$," Solid State Ionics, 2006, vol. 177, pp. 2721-2725.
Mizuno et al., "New, Highly Ion-Conductive Crystals Precipitated from $Li_2S$—$P_2S_5$ Glasses", Advanced Materials, 2005, vol. 17, No. 7, pp. 918-921.
Morimoto et al., "Mechanochemical Synthesis of New Amorphous Materials of $60Li_2S \cdot 40SiS_2$ with High Lithium Ion Conductivity," J. Am. Ceram. Soc., 1999, vol. 82, pp. 1352-1354.
Mukherjee, Rahul et al., "Defect-induced plating of lithium metal within porous graphene networks," Nature Communications, 5:3710 doi: 10.1038/ncomms4710, 2014, pp. 1-10.
Muramatsu et al., "Structural change of $Li_2S$—$P2S_5$ sulfide solid electrolytes in the atmosphere," Solid State Ionics, 2011, vol. 182, pp. 116-119.
Murayama et al., "Material Design of New Lithium Ionic Conductor thio-LISICON, in the $Li_2S$—$P_2S_5$ System," Solid State Ionics, 2004, vol. 170, pp. 173-180.
Murayama et al., "Synthesis of New Lithium Ionic Conductor Thio-LISICON-Lithium Silicon Sulfides System," Journal of Solid State Chemistry, 2002, vol. 168, pp. 140-148.
Norrel et al., "Anion exchange of Oxygen by Sulfur in $GeO_2$-based glasses," Proceedings of SPIE, 2003, vol. 4990, pp. 87-96.
Ohtomo et al., "Characteristics of the $Li_2O$—$Li_2S$—$P_2S_5$ glasses synthesized by the two-step mechanical milling," Journal of Non-Crystalline Solids, 2013, vol. 364, pp. 57-61.
Ohtomo et al., "Electrical and electrochemical properties of $Li_2S$—$P_2S_5P_2O_5$ glass-ceramic electrolytes," Journal of Power Sources, 2005, vol. 146, pp. 715-718.

(56) References Cited

OTHER PUBLICATIONS

Ohtomo et al., "Suppression of H2S gas from $Li_2S$—$P_2S_5$ glass electrolytes by the addition of $Li_2O$", The Electrochemical Society, 2012, Abstract #1189, 1 page.

Ooura et al., "A new lithium-ion conducting glass ceramic in the composition of $75Li_2S \cdot 5P_2S_3 \cdot 20P_2S_5$ (mol %)," Solid State Ionics, 2014, vol. 262, pp. 733-737.

Peled, E. et al., "Advanced Model for Solid Electrolyte Interphase Electrodes in Liquid and Polymer Electrolytes," J. Electrochem. Soc., Aug. 1997, vol. 144, No. 8, pp. L208-L210.

Pradel et al., "Ionically Conductive Chalcogenide Glasses, "Journal of Solid State Chemistry, 1992, vol. 96, pp. 247-257.

Pradel et al., "Lithium Chalcogenide Conductive Glasses, "Materials Chemistry and Physics, 1989, vol. 23, pp. 121-142.

Rao et al., "Synthesis and $Li^+$ ion Migration Studies of $Li_6PS_5X$ (X=Cl, Br, I)," Mater. Res. Soc. Symp. Proc., 2011, vol. 1331, DOI: 10.1557/opl.2011.1424; 6 pages.

Sahu et al., "Air-Stable, High-Conduction Solid Electrolytes of Arsenic-Substituted $Li_4SnS_4$," Energy Environ. Sci., 2014, vol. 7, pp. 1053-1058.

Sakuda et al., "All-solid-state lithium secondary batteries using $LiCoO_2$ particles with pulsed laser deposition coatings of $Li_2S$—$P_2S_5$ solid electrolytes," Journal of Power Sources, 2011, vol. 196, pri. 6735-6741.

Sakuda et al., "Sulfide Solid Electrolyte with Favorable Mechanical Property for All-Solid-State Lithium Battery," Scientific Reports, 3:2261, DOI: 10.1038/srep02261, 2013, 5 pages.

Seino et al., "A sulphide lithium super ion conductor is superior to liquid ion conductors for use in rechargeable batteries", Energy & Environmental Science, 2014, vol. 7, pp. 627-631.

Seino et al., "Synthesis and electrochemical properties of $Li_2S$—$B_2S_3$-$Li_4SiO_4$," Solid State Ionics, 2006, vol. 177, pp. 2601-2603.

Seino et al., "Synthesis of phosphorous sulfide solid electrolyte and all-solid-state lithium batteries with graphite electrode," Solid State Ionics, 2005, pp. 2389-2393.

Seino et al., Electronic Supplementary Material (ESI) to "A sulphide lithium super ion conductor is superior to liquid ion conductors for use in rechargeable batteries," Energy & Environmental Science, 2014, 4 pages.

Seo et al., "Fast lithium ion conducting solid state thin-film electrolytes based on lithium thio-germanate materials," Acta Materialia, 2011, vol. 59, pp. 1839-1846.

Seo et al., "Structural Properties of Lithium Thio-Germanate Thin Film Electrolytes Grown by Radio Frequency Sputtering," Inorganic Chemistry, 2011, vol. 50, pp. 2143-2150.

Sistla et at., "Structural studies on $xLi_2S$—$(1-x)P_2S_5$ glasses by X-ray diffraction and molecular dynamics simulation," Journal of Non-Crystalline Solids, 2004, vol. 349, pp. 54-59.

Sveinbjornsson et al., "Ionic Conductivity and the Formation of Cubic $CaH_2$ in the $LiBH_4$—$Ca(BH_4)_2$ Composite," Journal of Solid State Chemistry, 2014, vol. 211, pp. 81-89.

Tachez et al., "Ionic Conductivity of and Phase Transition in Lithium Thiophosphate $Li_3PS_4$," Solid State Ionics, 1984, vol. 14, pp. 181-185.

Takada et al., "Lithium ion conductive oxysulfide $Li_3PO_4$—$Li_3PS_4$," Solid State Ionics, 2005, vol. 176, pp. 2355-2359.

Takada et al., "Electrochemical behaviors of $Li^+$ ion conductor $Li_3PO_4$—$Li_2S$—$SiS_2$," Journal of Power Sources, 1993, vol. 43-44, pp. 135-141.

Takada et al., "Solid State Lithium Battery with Oxysulfide glass," Solid State Ionics, 1996, vol. 86-88, pp. 877-882.

Takahara et al., "Application of Lithium Metal Electrodes to All-Solid-State Lithium Secondary Batteries Using $Li_3PO_4$—$Li_2S$—$SiS_2$ Glass," Journal of the Electrochemical Society, 2004, vol. 151, No. 9, pp. A1309-A1313.

Tatsumisago et al., "All-solid-state lithium secondary batteries using sulfide-based glass-ceramic electrolytes," Journal of Power Sources, 2006, vol. 159, pp. 193-199.

Teragawa et al., "Preparation of $Li_2S$—$P_2S_5$ solid electrolyte from N-methylformamide solution and application for all-solid-state lithium battery," Journal of Power Sources, 2014, vol. 248, pp. 939-942.

Trevey et al., "Glass-ceramic $Li_2S$—$P_2S_5$ electrolytes prepared by a single step ball billing process and their application for all-solid-state lithium-ion batteries," Electrochemistry Communications, 2009, vol. 11, pp. 1830-1833.

Tu, Zhengyuan et al., "Nanostructured Electrolytes for Stable Lithium Electrodeposition in Secondary Batteries," Acc. Chem. Res., 2015, DOI: 10.1021/acs.accounts.5b00427, 10 pages.

Ujiie et al., "Preparation and electrochemical characterization of $(100-x)(0.7Li_2S\ 0.3P_2S_5)$ xLiBr glass-ceramic electrolytes," Mater Renew Systain Energy, 3:18, DOI: 10.1007/S40243-013-0018-x, 2014, 8 pages.

Wilkinson, D.P. et al., "In-situ study of electrode stack growth in rechargeable cells at constant pressure," J. Electroanal. Chem., 1993, vol. 355, pp. 193-203.

Yamashita et al., "Formation and ionic conductivity of $Li_2S$—$GeS_2$—$Ga_{2S3}$ glasses and thin films," Solid State Ionics, 2003, vol. 158, pp. 151-156.

Yamauchi et al., "Preparation and ionic conductivities of $(100-x)(0.75Li_2S\ 0.25P_2S_5)$ $xLiBH_4$ glass electrolytes," Journal of Power Sources, 2013, vol. 244, pp. 707-710.

Yan, Kai, "Ultrathin Two-Dimensional Atomic Crystals as Stable Interfacial Layer for Improvement of Lithium Metal Anode," Nano Lett., 2014, vol. 14, pp. 6016-6022.

Ye et al., "Shape-controlled fabrication of platinum electrocatalyst by pulse electrodeposition," Electrochemistry Communications, 2008, vol. 10, pp. 476-479.

Zheng et al., "Interconnected hollow carbon nanospheres for stable lithium metal anodes," Nature Nanotechnology, Aug. 2014, vol. 9, pp. 618-623.

Zoval et al., "Electrochemical preparation of platinum nanocrystallites with size selectivity on basal plane oriented graphite surfaces," J. Phys. Chem. B, 1998, vol. 102, pp. 1166-1175.

Kim et al., "High-energy and durable lithium metal batteries using garnet-type solid electrolytes with tailored lithium-metal compatibility", Nature Communications, (2022) 13:1883; https://doi.org/10.1038/s41467-022-29531-x.

Kim et al., "Surface engineering of inorganic solid-state electrolytes via interlayers strategy for developing long-cycling quasi-all-solid-state lithium batteries", Nature Communications (2023) 14:782; https://doi.org/10.1038/s41467-023-36401-7.

Lee et al., "High-energy long-cycling all-solid-state lithium metal batteries enabled by silver-carbon composite anodes", Nature Energy, Mar. 20, 2020, vol. 5, pp. 299-308; https://doi.org/10.1038/s41560-020-0575-z.

* cited by examiner

200

METAL NEGATIVE ELECTRODE ULTRASONIC CHARGING

This application is a National Stage filing under 35 U.S.C. 371 of International Patent Application No. PCT/US2018/021833, filed Mar. 9, 2018, which claims the benefit of priority to U.S. Provisional Application No. 62/470,069, filed on Mar. 10, 2017, which is incorporated by reference herein in its entirety for all purposes.

FIELD

The present disclosure concerns secondary batteries and methods of charging and discharging secondary batteries.

BACKGROUND

Ultrasonic vibration has been used for micro-metal forming applications. For example, aluminum, or other metal, yield strength reduces as a function of the vibration energy applied thereto. When energy is applied to a metal via ultrasonic vibration, the metal is observed to behave like a metal at an elevated temperature.

Some researchers have applied mechanical excitation to liquid state electrochemical cells in Pb-acid batteries, e.g., US20060051659A1 for the purpose of causing preferential formation of ionic bonds versus covalent bonds in an electrode. Other researchers have applied ultrasonic energy to interact with and enhance (i.e., speed up) electrochemical reaction rates at the electrode-electrolyte interface, which take place within and on the surface of the battery's electrodes. See, for example, http://www.activegridtech.com/wp-content/uploads/2012/03/BattCon-2012-AGT-Presentation.pdf. The application of ultrasonic energy in this instance reduces kinetic ionic inefficiencies which result in system impedance imbalances (i.e., impedance mismatch) with the intention of producing a more efficient energy conversion system.

Solid state batteries such as lithium metal batteries have a higher energy density and lower cost than any commercial rechargeable battery presently available. However, batteries with lithium metal anodes often suffer from dendrite formation during charging, which cause unsafe failures and short-circuits. Further, batteries with lithium metal may need to operate under high and uniform pressure. See, for example, U.S. Pat. No. 6,835,492. Applying a high and uniform pressure is a challenge when the pressure application device is in a form factor that must be small and light. Thus, improvements in the relevant field are needed.

Sonication techniques have not been applied to solid state batteries, due to a variety of concerns. Solid state batteries include a solid electrolyte which separates the positive and negative electrodes. This solid electrolyte can be a thin film or a pressed pellet of a solid electrolyte (e.g., a lithium stuffed garnet electrolyte). Because a sonication device would likely consume valuable volume and weight in a battery pack, which in turn would dilute the energy density in a given battery pack, sonication devices have not been combined with rechargeable batteries such as Li-ion batteries, at least not in a commercially viable manner, to date. Energy density is a key metric for a battery system (e.g., automotive battery pack) and there has been little motivation to incorporate a sonication device with solid state batteries since such a device is likely to reduce the energy density per weight or per volume. In addition, a sonication device requires energy to operate. The energy required to operate the sonication device is not available to perform other useful work on a system such as the drive-train of a car. Also, a sonication device could potentially fracture a brittle solid electrolyte in a solid state battery, resulting in device failure. Thus, there is a need in the relevant art for methods and systems for combining sonication devices with rechargeable batteries, including solid state batteries.

Accordingly, there is a need for improved systems and methods for charging lithium metal anodes, for combining sonication devices with rechargeable solid-state batteries, and for preventing Li dendrite formation in electrochemical cells. The instant disclosure provides systems and methods to charge a battery with a lithium metal negative electrode safely by applying mechanical energy (e.g., vibrational energy) to an electrochemical cell.

SUMMARY

In one embodiment, set forth herein are methods for ultrasonically vibrating a metal negative electrode, including providing an electrochemical cell, wherein the electrochemical cell includes a positive electrode, a solid electrolyte, and a metal negative electrode. The methods include vibrating the metal negative electrode (e.g., a Li metal negative electrode) ultrasonically, and charging the electrochemical cell.

In a second embodiment, set forth herein is a method of charging a battery having a metal negative electrode, the method comprising providing a battery having less than a full charge; vibrating the battery at ultrasonic frequencies; and charging the battery.

In a third embodiment, set forth herein is a system for performing a method set forth herein.

In a fourth embodiment, set forth herein is an electrochemical cell having a metal negative electrode made by a method set forth herein.

BRIEF DESCRIPTIONS OF THE DRAWINGS

DETAILED DESCRIPTION

I. General

Figure 1:
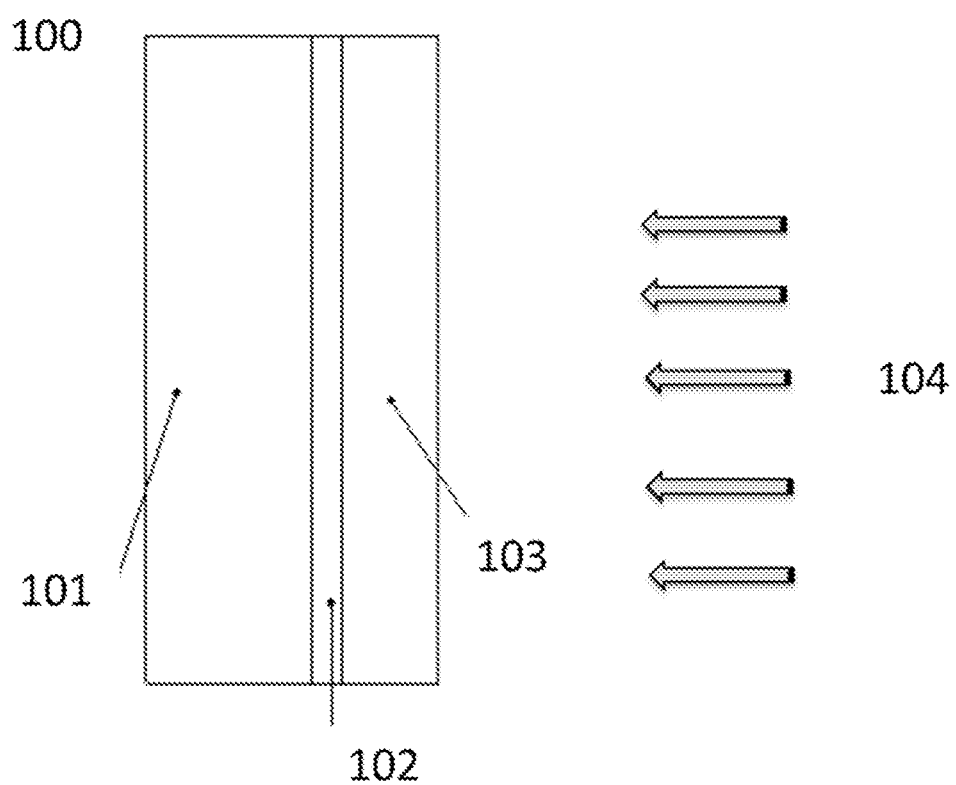
FIG. 1 shows an electrochemical cell (100) having a positive electrode (101), a solid electrolyte (102), and a metal negative electrode (103).

The disclosure herein sets forth the use of an ultrasonic vibration generator (e.g., piezo-electric actuator or other sources of vibration) to apply vibrational energy to the negative electrode side of a battery. In some examples, the application of vibrational energy to the negative electrode side of a battery occurs during a charging event. The input of energy via ultrasonic vibration locally increases the energy of the metal negative electrode and creates a softer metal as if the metal were heated. In some examples, the vibrational energy is applied through the battery starting from the positive electrode side of the battery. In some examples, the vibrational energy is applied through the battery starting from the negative electrode side of the battery. In some examples, the vibrational energy is ultrasonication energy.

II. Definitions

As used herein, the term "about," when qualifying a number, e.g., 15% w/w, refers to the number qualified and optionally the numbers included in a range about that qualified number that includes ±10% of the number. For example, about 15 w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the phrases "electrochemical cell" or "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein, the terms "positive electrode" and "negative electrode" refer to the electrodes of a battery. During a charge cycle in a Li-secondary battery, Li ions leave the positive electrode and move through an electrolyte, to the negative electrode. During a charge cycle, electrons leave the positive electrode and move through an external circuit to the negative electrode. During a discharge cycle in a Li-secondary battery, Li ions migrate towards the positive electrode through an electrolyte and from the negative electrode. During a discharge cycle, electrons leave the negative electrode and move through an external circuit to the positive electrode.

As used herein the phrase "electrochemical stack," refers to one or more units which each include at least a negative electrode (e.g., Li, $LiC_6$), a positive electrode (e.g., Li-nickel-manganese-oxide, nickel manganese cobalt oxide (NMC), nickel cobalt aluminum oxide (NCA), or $FeF_3$, optionally combined with a solid state electrolyte or a gel electrolyte), and a solid electrolyte (e.g., an oxide electrolyte set forth herein) between and in contact with the positive and negative electrodes. In some examples, between the solid electrolyte and the positive electrode, there is an additional layer comprising a gel electrolyte such as, e.g., a gel electrolyte described in PCT International Patent Application Publication No. WO 2017/197406, published on Nov. 16, 2017, titled "SOLID ELECTROLYTE SEPARATOR BONDING AGENT", which gel electrolytes are incorporated by reference herein in their entirety for all purposes. An electrochemical stack may include one of these aforementioned units. An electrochemical stack may or may not include a positive current collector and/or a negative current collector. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array. In some examples, when the electrochemical stack includes several units, the stacks are arranged such that one negative electrode is shared with two or more positive electrodes. Alternatively, in some examples, when the electrochemical stack includes several units, the stacks are arranged such that one positive electrode is shared with two or more negative electrodes. Unless specified otherwise, an electrochemical stack includes at least one positive electrode, at least one solid electrolyte, and at least one negative electrode, and optionally includes a gel electrolyte layer between the positive electrode and the solid electrolyte.

As used herein, the term "electrolyte," refers to an ionically conductive and electrically insulating material. Electrolytes are useful for electrically insulating the positive and negative electrodes of a secondary battery while allowing for the conduction of ions, e.g., Li+, through the electrolyte. In some of the electrochemical devices described herein, the electrolyte includes a solid film, pellet, or monolith of a Li+ conducting oxide, such as a lithium-stuffed garnet. In some examples, the electrolyte further includes a gel electrolyte which is laminated to or directly contacts the solid film, pellet, or monolith. As used herein, the phrase "lithium stuffed garnet" refers to oxides that are characterized by a crystal structure related to a garnet crystal structure. U.S. Patent Application Publication No. U.S. 2015/0099190, which published Apr. 9, 2015 and was filed Oct. 7, 2014 as Ser. No. 14/509,029, is incorporated by reference herein in its entirety for all purposes. This application describes Li-stuffed garnet solid-state electrolytes used in solid-state lithium rechargeable batteries. These Li-stuffed garnets generally having a composition according to $Li_4Li_{a_B}M'_CM''_DZr_EO_F$, $Li_4La_BM'_CM'_DTa_EO_F$, or $Li_4Li_{a_B}M'_CM''_DNb_EO_F$, wherein 4<A<8.5, 1.5<B<4, 0<C<2, 0<D<2; 0≤E<2, 10<F<13, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein 5<a<8.5; 2<b<4; 0<c≤2.5; 0≤d<2; 0≤e<2, and 10<f<13 and Me" is a metal selected from Nb, Ta, V, W, Mo, or Sb and as otherwise described in U.S. Patent Application Publication No. U.S. 2015/0099190. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (subscripts t1+t2+t3=subscript 2) so that the La:(Zr/Nb/Ta) ratio is 3:2. Also, garnets used herein include, but are not limited to, $Li_xLa_3Zr_2O_F+yAl_2O_3$, wherein x ranges from 5.5 to 9; and y ranges from 0 to 1. In these examples, subscripts x, y, and F are selected so that the garnet is charge neutral. In some examples x is about 7 and y is about 1. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_xLa_3Zr_2O_{12}+yAl_2O_3$. In one embodiment, the Li-stuffed garnet herein has a composition of $Li_7La_3Zr_2O_{12}$. In another embodiment, the Li-stuffed garnet herein has a composition of $Li_7La_3Zr_2O_{12} \cdot Al_2O_3$. In yet another embodiment, the Li-stuffed garnet herein has a composition of $Li_7La_3Zr_2O_{12} \cdot 0.22Al_2O_3$. In yet another embodiment, the Li-stuffed garnet herein has a composition of $Li_7La_3Zr_2O_{12} \cdot 0.35Al_2O_3$. In certain other embodiments, the Li-stuffed garnet herein has a composition of $Li_7La_3Zr_2O_{12} \cdot 0.5Al_2O_3$. In another embodiment, the Li-stuffed garnet herein has a composition of $Li_7La_3Zr_2O_{12} \cdot 0.75Al_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. As used herein, garnets do not include nesosilicates having the general formula $X_3Y_2(SiO_4)_3$ wherein X is Ca, Mg, Fe, and, or, Mn; and Y is Al, Fe, and, or, Cr.

As used herein the phrase "garnet-type electrolyte," refers to an electrolyte that includes a lithium stuffed garnet material described herein as the Li+ ion conductor. The advantages of Li-stuffed garnet solid-state electrolytes are many, including as a substitution for liquid, flammable electrolytes commonly used in lithium rechargeable batteries.

As used herein, the phrase "inorganic solid state electrolyte," refers to a material not including carbon which conducts ions (e.g., Li+) but does not conduct electrons. Non-limiting examples of inorganic solid state electrolytes include oxide electrolytes and sulfide electrolytes, which are further described in the instant disclosure.

As used herein, the phrase "directly contacts," refers to the juxtaposition of two materials such that the two materials contact each other sufficiently to conduct either an ion or electron current. As used herein, direct contact may also refer to two materials in contact with each other and which do not have any other different types of solid or liquid materials positioned between the two materials which are in direct contact.

In some examples, the electrolytes herein may include, or be layered with, or be laminated to, or contact a sulfide electrolyte. As used herein, the phrase "sulfide electrolyte," includes, but is not limited to, electrolytes referred to herein as LATS, LSS, LTS, LXPS, or LXPSO, where X is Si, Ge, Sn, As, Al. In these acronyms (LSS, LTS, LXPS, or LXPSO), S refers to the element S, Si, or combinations thereof, and T refers to the element Sn. "Sulfide electrolyte" may also include $Li_aP_bS_cX_d$, $Li_aB_bS_cX_d$, $Li_aSn_bS_cX_d$ or $Li_aSi_bS_cX_d$ where X=F, Cl, Br, I, and $10\% \le a \le 50\%$, $10\% \le b \le 44\%$, $24\% \le c \le 70\%$, $0 \le d \le 18\%$.

In some examples, the sulfide electrolyte layer is a material containing Si, Li, O, P, and S and is referred to herein as a SLOPS material. In some examples, the electrolyte layer is a material containing Si, Li, O, P, and S and is referred to herein as a SLOPS/LSS material. As used herein, LSS includes, unless otherwise specified, a 60:40 molar ratio $Li_2S:SiS_2$.

As used herein, "SLOPS" includes, unless otherwise specified, a 60:40 molar ratio of $Li_2S:SiS_2$ with 0.1-10 mol. % $Li_3PO_4$. In some examples, "SLOPS" includes $Li_{10}Si_4S_{13}$ (50:50 $Li_2S:SiS_2$) with 0.1-10 mol. % $Li_3PO_4$. In some examples, "SLOPS" includes $Li_{26}Si_7S_{27}$ (65:35 $Li_2S:SiS_2$) with 0.1-10 mol. % $Li_3PO_4$. In some examples, "SLOPS" includes $Li_4SiS_4$ (67:33 $Li_2S:SiS_2$) with 0.1-5 mol. % $Li_3PO_4$. In some examples, "SLOPS" includes $Li_{14}Si_3Si_3$ (70:30 $Li_2S:SiS_2$) with 0.1-5 mol. % $Li_3PO_4$. In some examples, "SLOPS" is characterized by the formula $(1-x)(60:40\ Li_2S:SiS_2)*(x)(Li_3PO_4)$, wherein x is from 0.01 to 0.99. As used herein, "LBS-PDX" refers to an electrolyte composition of $Li_2S:B_2S_3:Li_3PO_4$:LiX where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used herein, "LSS" refers to lithium silicon sulfide which can be described as $Li_2S$—$SiS_2$, Li—$SiS_2$, Li—S—Si, and/or a catholyte consisting essentially of Li, S, and Si. LSS refers to an electrolyte material characterized by the formula $Li_xSi_yS_z$ where $0.33 \le x \le 0.5$, $0.1 \le y \le 0.2$, $0.4 \le z \le 0.55$, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S:SiS_2$ is 90:10, 85:15, 80:20, 75:25, 70:30, 2:1, 65:35, 60:40, 55:45, or 50:50 molar ratio. LSS may be doped with compounds such as $Li_xPO_y$, $Li_xBO_y$, $Li_4SiO_4$, $Li_3MO_4$, $Li_3MO_3$, $PS_x$, and/or lithium halides such as, but not limited to, LiI, LiCl, LiF, or LiBr, wherein $0 < x \le 5$ and $0 < y \le 5$.

As used herein, "LTS" refers to a lithium tin sulfide compound which can be described as $Li_2S:SnS_2:As_2S_5$, $Li_2S$—$SnS_2$, $Li_2S$—SnS, Li—S—Sn, and/or a catholyte consisting essentially of Li, S, and Sn. The composition may be $Li_xSn_yS_z$ where $0.25 \le x \le 0.65$, $0.05 \le y \le 0.2$, and $0.25 \le z \le 0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In and/or lithium halides such as, but not limited to, LiI, LiCl, LiF, or LiBr, As used herein, "LATS" refers to LTS, as used above, and further comprising Arsenic (As).

As used herein, "LXPS" refers to a material characterized by the formula LiaMPbSc, where M is Si, Ge, Sn, and/or Al, and where $2 \le a \le 8$, $0.5 \le b \le 2.5$, $4 \le c \le 12$. "LSPS" refers to an electrolyte material characterized by the formula LaSiPbSc, where $2 \le a \le 8$, $0.5 \le b \le 2.5$, $4 \le c \le 12$. LSPS refers to an electrolyte material characterized by the formula LaSiPbSc, wherein, where $2 \le a \le 8$, $0.5 \le b \le 4 \le c \le 12$, d<3. In these examples, the subscripts are selected so that the compound is neutrally charged. Exemplary LXPS materials are found, for example, in PCT International Patent Application Publication No. WO 2014/186634, which published on Nov. 20, 2014, titled "SOLID STATE CATHOLYTE OR ELECTROLYTE FOR BATTERY USING LIAMPBSC (M=Si, Ge, AND/OR Sn)", which is incorporated by reference herein in its entirety for all purposes. When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to an electrolyte material characterized by the formula LiaMPbScOd, where M is Si, Ge, Sn, and/or Al, and where $2 \leq a \leq 8$, $0.5 \leq b \leq 2.5$, $4 \leq c \leq 12$, $d < 3$. LXPSO refers to LXPS, as defined above, and having oxygen doping at from 0.1 to about 10 atomic %. LPSO refers to LPS, as defined above, and having oxygen doping at from 0.1 to about 10 atomic %.

As used herein, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %. LPS refers to an electrolyte material that can be characterized by the formula $Li_xP_yS_z$ where $0.33 \leq x \leq 0.67$, $0.07 \leq y \leq 0.2$ and $0.4 \leq z \leq 0.55$. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %. LPS may also be doped with a lithium halide such as LiF, LiCl, LiBr, or LiI at a 0-40% molar content.

As used herein, "LBS" refers to an electrolyte material characterized by the formula LiaBbSc and may include oxygen and/or a lithium halide (LiF, LiCl, LiBr, LiI) at 0-40 mol %.

As used herein, "LPSO" refers to an electrolyte material characterized by the formula $Li_xP_yS_zO_w$, where $0.33 \leq x \leq 0.67$, $0.07 \leq y \leq 0.2$, $0.4 \leq z \leq 0.55$, $0 \leq w \leq 0.15$. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used herein, the term "LBHI" refers to a lithium conducting electrolyte comprising Li, B, H, and I. LBHI includes a compound having the formula $aLiBH_4+bLiX$ where X=Cl, Br, and/or I and where a:b=7:1, 6:1, 5:1, 4:1, 3:1, 2:1, or within the range a/b=2-4. LBHI may further include nitrogen in the form of compound having the formula $aLiBH_4+bLiX+cLiNH_2$ where (a+c)/b=2-4 and c/a=0-10. Non-limiting examples of LBHI include LBHI described in PCT International Patent Application number PCT/US2017/057735 filed on Oct. 20, 2017, which disclosure is incorporated by reference herein in its entirety for all purposes.

As used herein, the term "LPSI" refers to a lithium conducting electrolyte comprising Li, P, S, and I. LPSI includes a compound having the formula $aLi2S+bP2Sy+cLiX$ where X=Cl, Br, and/or I and where y=3-5 and where a/b=2.5-4.5 and where (a+b)/c=0.5-15. Non-limiting examples of LPSI include LPSI described in PCT International Patent Application Publication No. WO 2017/096088, which published on Jun. 8, 2017, titled "LITHIUM, PHOSPHORUS, SULFUR, AND IODINE INCLUDING ELECTROLYTE AND CATHOLYTE COMPOSITIONS, ELECTROLYTE MEMBRANES FOR ELECTROCHEMICAL DEVICES, AND ANNEALING METHODS OF MAKING THESE ELECTROLYTES AND CATHOLYTES", which disclosure is incorporated by reference herein in its entirety for all purposes.

Also contemplated are instances where any of the aforementioned electrolytes may be catholytes.

As used herein, the term "LIRAP" refers to a lithium rich antiperovskite and is used synonymously with "LOC" or "$Li_3OCl$". The composition of LIRAP is $aLi_2O+bLiX+cLiOH+dAl_2O_3$ where X=Cl, Br, and/or I, a/b=0.7-9, c/a=0.01-1, d/a=0.001-0.1.

As used herein, the phrase "ultrasonically vibrating a metal negative electrode," or "vibrating," unless specified otherwise to the contrary, refer to the application of ultrasonic vibrational energy to a metal negative electrode in an electrochemical cell. The vibrating may occur before, during, or after a charging event. The frequency of vibration can be modulated to accommodate a variety of charging scenarios.

As used herein, the phrase "SOC" refers to a battery state-of-charge as a percentage of full charge. When a battery is fully charged, its SOC is 100%; when a battery is fully discharged, its SOC is 0%; when a battery is half-charged, its SOC is 50%. SOC may be determined by measuring charge passed over time, voltage, voltage hysteresis, impedance, temperature, pressure, or any other metric which is indicative of the SOC.

As used herein, the phrase "full charge," refers to an electrochemical cell having a 100% state-of-charge (SOC). As used herein, the phrase "less than a full charge," refers to an electrochemical cell having a SOC less than 100%. Full charge may be relative to a rated or nameplate capacity of the battery when measured at beginning of life at a specified rate and temperature.

As used herein, the term "charging," or the phrase "charging the electrochemical cell," unless specified otherwise to the contrary, refer to a process whereby energy is applied to an electrochemical cell in order to increase its SOC. Charging typically involves applying a high voltage to the battery in a polarity that causes positive ions to flow from the positive electrode to the negative electrode.

III. Methods

Set forth herein are unique methods of applying energy to a metal negative electrode in an electrochemical cell during the charging process. In an example, set forth herein is a method for ultrasonically vibrating a metal negative electrode, wherein the method includes (1) providing an electrochemical cell, which includes a metal negative electrode; and (2) vibrating the metal negative electrode ultrasonically. In an example, set forth herein is a method for ultrasonically vibrating a metal negative electrode, wherein the method includes (1) providing an electrochemical cell, which includes a metal negative electrode; (2) vibrating the metal negative electrode ultrasonically; and (3) charging the electrochemical cell. In an example, set forth herein is a method for ultrasonically vibrating a metal negative electrode, wherein the method includes (1) providing an electrochemical cell, which includes a positive electrode, a solid electrolyte, and a metal negative electrode; (2) vibrating the metal negative electrode ultrasonically; and (3) charging the electrochemical cell. In any of the said methods, in one example, the metal negative electrode is a lithium (Li) metal negative electrode. In any of the said methods, in one example, the metal negative electrode is a sodium (Na) metal negative electrode. In any of the said methods, in one example, the metal negative electrode is a zinc (Zn) metal negative electrode.

In some examples, the vibrating and charging occur simultaneously. In some other examples, the vibrating and charging occur sequentially—vibrating and then charging, or charging and then vibrating. In yet other examples, the vibrating and charging occur sequentially and repeatedly, e.g., charging, vibrating, charging, vibrating, charging, and so forth. In yet other examples, the vibrating and charging occur sequentially and repeatedly for at least 10 repeats of vibrating and charging. In yet other examples, the vibrating and charging occur sequentially and repeatedly for at least 100 repeats of vibrating and charging. In yet other examples, the vibrating and charging occur sequentially and repeatedly for at least 1000 repeats of vibrating and charging.

The methods described herein are applicable to coin cells, pouch cells, can cells, or any other suitable forms of cells, electrochemical cells, or batteries. The application of any mechanical energy (e.g., vibrational energy) is effected, in some examples, by contacting the exterior surface of the cell with a suitable device (e.g., a sonication device). In alternate embodiments, a suitable device (e.g., a sonication device) may be placed inside the cell. In further embodiments, a suitable device (e.g., a sonication device) may contact the exterior surface of the cell and may also reside inside the cell. By way of example only, a sonication device may be a piezoelectric material contacting the exterior surface of the cell and/or placed inside the cell. In further embodiments, a suitable device (e.g., a sonication device) may also be positioned in close proximity to the cell. In some examples, a sonication device may be placed in a battery module, in a battery system, and/or in a battery pack.

In some examples, including any of the foregoing, the methods include charging which occurs at a temperature lower than 80° C., 75° C., 70° C., 65° C., 60° C., 55° C., 50° C., 45° C., 40° C., 35° C., 30° C., 25° C., 20° C., 15° C., 10° C., 5° C., 0° C., −5° C., −10° C., −15° C., −20° C., −25° C., or −30° C. In certain examples, including any of the foregoing, the methods include charging which occurs at a temperature lower than 80° C. In certain examples, including any of the foregoing, the methods include charging which occurs at a temperature lower than 75° C. In certain examples, including any of the foregoing, the methods include charging which occurs at a temperature lower than 70° C. In certain examples, including any of the foregoing, the methods include charging which occurs at a temperature lower than 65° C. In certain examples, including any of the foregoing, the methods include charging which occurs at a temperature lower than 60° C. In certain examples, including any of the foregoing, the methods include charging which occurs at a temperature lower than 55° C. In certain examples, including any of the foregoing, the methods include charging which occurs at a temperature lower than 50° C. In certain examples, including any of the foregoing, the methods include charging which occurs at a temperature lower than 45° C. In certain examples, including any of the foregoing, the methods include charging which occurs at a temperature lower than 40° C. In certain examples, including any of the foregoing, the methods include charging which occurs at a temperature lower than 35° C. In certain examples, including any of the foregoing, the methods include charging which occurs at a temperature lower than 30° C. In certain examples, including any of the foregoing, the methods include charging which occurs at a temperature lower than 25° C. In certain examples, including any of the foregoing, the methods include charging which occurs at a temperature lower than 20° C. In certain examples, including any of the foregoing, the methods include charging which occurs at a temperature lower than 15° C. In certain examples, including any of the foregoing, the methods include charging which occurs at a temperature lower than 10° C. In certain examples, including any of the foregoing, the methods include charging which occurs at a temperature lower than 5° C. In certain examples, including any of the foregoing, the methods include charging which occurs at a temperature lower than 0° C. In certain examples, including any of the foregoing, the methods include charging which occurs at a temperature lower than 80° C. In certain examples, including any of the foregoing, the methods include charging which occurs at a temperature lower than −5° C. In certain examples, including any of the foregoing, the methods include charging which occurs at a temperature lower than −10° C. In certain examples, including any of the foregoing, the methods include charging which occurs at a temperature lower than −15° C. In certain examples, including any of the foregoing, the methods include charging which occurs at a temperature lower than −20° C. In certain examples, including any of the foregoing, the methods include charging which occurs at a temperature lower than −25° C. In certain examples, including any of the foregoing, the methods include charging which occurs at a temperature lower than −30° C. In some examples, the charging occurs at least at a temperature of −30° C. or greater.

In some examples, including any of the foregoing, the metal negative electrode is a lithium (Li) metal negative electrode. In some of these examples, the Li negative electrode is selected from Li foil or evaporated Li. In some of these examples, the metal negative electrode (e.g., Li negative electrode) is deposited in the electrochemical cell during charging. In some examples, the thickness of the metal negative electrode ranges from about 1, 2, 3, 4, 5, 10, 15, 20, 25, 30 µm to about 5, 6, 7, 8, 9, 10, 15, 20, 30, 40, 50 µm. In some instances, the thickness of the metal negative electrode is about 1 µm. In some instances, the thickness of the metal negative electrode is about 2 µm. In some instances, the thickness of the metal negative electrode is about 3 µm. In some instances, the thickness of the metal negative electrode is about 4 µm. In some instances, the thickness of the metal negative electrode is about 5 µm. In some instances, the thickness of the metal negative electrode is about 6 µm. In some instances, the thickness of the metal negative electrode is about 7 µm. In some instances, the thickness of the metal negative electrode is about 8 µm. In some instances, the thickness of the metal negative electrode is about 9 µm. In some instances, the thickness of the metal negative electrode is about 10 µm. In some instances, the thickness of the metal negative electrode is about 15 µm. In some instances, the thickness of the metal negative electrode is about 20 µm. In some instances, the thickness of the metal negative electrode is about 25 µm. In some instances, the thickness of the metal negative electrode is about 30 µm. In some instances, the thickness of the metal negative electrode is about 35 µm. In some instances, the thickness of the metal negative electrode is about 40 µm. In some instances, the thickness of the metal negative electrode is about 45 µm. In some instances, the thickness of the metal negative electrode is about 50 µm.

In some examples, including any of the foregoing, the metal negative electrode is a sodium (Na) metal negative electrode. In other examples, the metal negative electrode is a zinc (Zn) metal negative electrode.

In some examples, including any of the foregoing, the solid electrolyte is a sulfide-based electrolyte or a garnet-based electrolyte or a borohydride-based electrolyte. In certain examples, the solid electrolyte is a sulfide-based electrolyte. In certain other examples, the solid electrolyte is a garnet-based electrolyte. In yet other examples, the solid electrolyte is a borohydride-based electrolyte. Examples of solid electrolytes include and are not limited to solid electrolytes described in US Patent Application Publication No. US 2015/0099188, which published on Apr. 9, 2015, titled "GARNET MATERIALS FOR LI SECONDARY BATTERIES AND METHODS OF MAKING AND USING GARNET MATERIALS", US Patent Application Publication No. US 2015/0099190, which published on Apr. 9, 2015, titled "GARNET MATERIALS FOR LI SECONDARY BATTERIES AND METHODS OF MAKING AND USING GARNET MATERIALS", U.S. Pat. No. 9,172,114, which issued on Oct. 27, 2015, titled "SOLID STATE CATHOLYTES AND ELECTROLYTES FOR ENERGY STORAGE DEVICES", U.S. Pat. No. 9,634,354, which issued on Apr. 25, 2017, titled "SOLID STATE CATHOLYTES AND ELECTROLYTES FOR ENERGY STORAGE DEVICES", U.S. Pat. No. 9,553,332, which issued on Jan. 24, 2017, titled "SOLID STATE CATHOLYTES AND ELECTROLYTES FOR ENERGY STORAGE DEVICES" US Patent Application Publication No. US 2014/0113187, which published on Apr. 24, 2014, titled "METHOD FOR FORMING AND PROCESSING ANTIPEROVSKITE MATERIAL DOPED WITH ALUMINUM MATERIAL", US Patent Application Publication No. US 2017/0214084, which published on Jul. 27, 2017, titled "ANNEALED GARNET ELECTROLYTE SEPARATORS", PCT International Patent Application Publication No. WO 2017/131676, which published on Aug. 3, 2017, titled "ANNEALED GARNET ELECTROLYTE SEPARATORS", PCT International Patent Application Publication No. WO 2017/096088, which published on Jun. 8, 2017, titled "LITHIUM, PHOSPHORUS, SULFUR, AND IODINE INCLUDING ELECTROLYTE AND CATHOLYTE COMPOSITIONS, ELECTROLYTE MEMBRANES FOR ELECTROCHEMICAL DEVICES, AND ANNEALING METHODS OF MAKING THESE ELECTROLYTES AND CATHOLYTES", US Patent Application Publication No. US 2017/0005367, which published on May 1, 2017, titled "COMPOSITE ELECTROLYTES", WO 2016/210371, which published on Dec. 29, 2016, titled "COMPOSITE ELECTROLYTES", PCT International Patent Application No. PCT/US2017/057735, filed on Oct. 20, 2017, PCT International Patent Application No. PCT/US2017/057462, filed on Oct. 19, 2017, and PCT International Patent Application No. PCT/US2017/057739, filed on Oct. 20, 2017, each of which is incorporated by reference herein in its entirety for all purposes.

In some examples, including any of the foregoing, the methods include applying a pressure to the metal negative electrode. In certain examples, the applied pressure is at least 10, 20, 30, 40, 50, 60, 70, 80, 90, 100, 200, 300, 400, 500, 600, 700, 800, 900, 1000, 2000, 3000, or 4000, pounds per square inch (PSI). In some examples, including any of the foregoing, the methods include applying a pressure to the metal negative electrode where the pressure is in a range of about 10, 20, 30, 40 PSI to about 1000, 2000, 3000, 4000 PSI. In some of these examples, the pressure is 10 PSI. In some of these examples, the pressure is 20 PSI. In some of these examples, the pressure is 10 PSI. In some of these examples, the pressure is 30 PSI. In some of these examples, the pressure is 40 PSI. In some of these examples, the pressure is 50 PSI. In some of these examples, the pressure is 60 PSI. In some of these examples, the pressure is 70 PSI. In some of these examples, the pressure is 80 PSI. In some of these examples, the pressure is 90 PSI. In some of these examples, the pressure is 100 PSI. In some of these examples, the pressure is 200 PSI. In some of these examples, the pressure is 300 PSI. In some of these examples, the pressure is 400 PSI. In some of these examples, the pressure is 500 PSI. In some of these examples, the pressure is 600 PSI. In some of these examples, the pressure is 700 PSI. In some of these examples, the pressure is 800 PSI. In some of these examples, the pressure is 900 PSI. In some of these examples, the pressure is 1000 PSI. In some of these examples, the pressure is 2000 PSI. In some of these examples, the pressure is 3000 PSI. In some of these examples, the pressure is 4000 PSI.

In some examples, including any of the foregoing, the methods include applying a pressure to the metal negative electrode. In certain examples, the pressure is at least 10, 20, 30, 40, 50, 60, 70, 80, 90, 100, 200, 300, 400, 500, 600, 700, 800, 900, 1000, 2000, 3000, 4000, pounds per square inch (PSI). In some of these examples, the pressure is about 10 PSI. In some of these examples, the pressure is about 20 PSI. In some of these examples, the pressure is 10 PSI. In some of these examples, the pressure is about 30 PSI. In some of these examples, the pressure is about 40 PSI. In some of these examples, the pressure is about 50 PSI. In some of these examples, the pressure is about 60 PSI. In some of these examples, the pressure is about 70 PSI. In some of these examples, the pressure is about 80 PSI. In some of these examples, the pressure is about 90 PSI. In some of these examples, the pressure is about 100 PSI. In some of these examples, the pressure is about 200 PSI. In some of these examples, the pressure is about 300 PSI. In some of these examples, the pressure is about 400 PSI. In some of these examples, the pressure is about 500 PSI. In some of these examples, the pressure is about 600 PSI. In some of these examples, the pressure is about 700 PSI. In some of these examples, the pressure is about 800 PSI. In some of these examples, the pressure is about 900 PSI. In some of these examples, the pressure is about 1000 PSI. In some of these examples, the pressure is about 2000 PSI. In some of these examples, the pressure is about 3000 PSI. In some of these examples, the pressure is about 4000 PSI.

In some examples, including any of the foregoing, the methods include applying a pressure to the metal negative electrode, wherein the applied pressure is less than 1000, 600, 500, 400, 300, 200, 100, 90, 80, 70, 60, 50, 40, 30, 20, or 10 PSI. In some of these examples, the pressure is less than 1000 PSI. In some of these examples, the pressure is less than 600 PSI. In some of these examples, the pressure is less than 500 PSI. In some of these examples, the pressure is less than 400 PSI. In some of these examples, the pressure is less than 300 PSI. In some of these examples, the pressure is less than 200 PSI. In some of these examples, the pressure is less than 100 PSI. In some of these examples, the pressure is less than 90 PSI. In some of these examples, the pressure is less than 80 PSI. In some of these examples, the pressure is less than 70 PSI. In some of these examples, the pressure is less than 60 PSI. In some of these examples, the pressure is less than 50 PSI. In some of these examples, the pressure is less than 40 PSI. In some of these examples, the pressure is less than 30 PSI. In some of these examples, the pressure is less than 20 PSI. In some of these examples, the pressure is less than 10 PSI. In some examples, the pressure is at least 10 PSI.

In some examples, including any of the foregoing, the methods include vibrating and charging simultaneously.

In some examples, including any of the foregoing, the methods include charging, first, and then, vibrating.

In some examples, including any of the foregoing, set forth herein is a method of charging a battery having a metal negative electrode, wherein the method includes providing a battery having less than a full charge; vibrating the battery at ultrasonic frequencies; and charging the battery. In some of these examples, the pressure applied to the metal negative electrode is 1000 PSI or less. In some of these examples, the pressure applied to the metal negative electrode is 600 PSI or less. In some of these examples, the vibrating and charging occur concurrently. In some of these examples, the pressure applied to the metal negative electrode is 300 PSI or less. In some of these examples, the pressure applied to the metal negative electrode is 200 PSI or less. In some of these examples, the pressure applied to the metal negative electrode is 100 PSI or less. In some of these examples, the pressure applied to the metal negative electrode is 90 PSI or less. In some of these examples, the pressure applied to the metal negative electrode is 80 PSI or less. In some of these examples, the pressure applied to the metal negative electrode is 70 PSI or less. In some of these examples, the pressure applied to the metal negative electrode is 60 PSI or less. In some of these examples, the pressure applied to the metal negative electrode is 50 PSI or less. In some of these examples, the pressure applied to the metal negative electrode is 40 PSI or less. In some of these examples, the pressure applied to the metal negative electrode is 30 PSI or less. In some of these examples, the pressure applied to the metal negative electrode is 0 PSI or less. In some of these examples, the pressure applied to the metal negative electrode is 10 PSI or less. In some of these examples, the pressure applied to the metal negative electrode is 5 PSI or less. In some of these examples, the pressure applied to the metal negative electrode is at least 0.5 PSI.

In some examples, including any of the foregoing, set forth herein is a method of charging a battery having a metal negative electrode, wherein the method includes charging wherein the current at which the charging occurs is at least 1 mA/cm$^2$, 2 mA/cm$^2$, 3 mA/cm$^2$, 4 mA/cm$^2$, 5 mA/cm$^2$, 6 mA/cm$^2$, or 10 mA/cm$^2$. In some examples, the current at which the charging occurs is at least 1 mA/cm$^2$. In some examples, the current at which the charging occurs is at least 2 mA/cm$^2$. In some examples, the current at which the charging occurs is at least 3 mA/cm$^2$. In some examples, the current at which the charging occurs is at least 4 mA/cm$^2$. In some examples, the current at which the charging occurs is at least 5 mA/cm$^2$. In some examples, the current at which the charging occurs is at least 6 mA/cm$^2$. In some examples, the current at which the charging occurs is at least 10 mA/cm$^2$.

In some examples, including any of the foregoing, set forth herein is a method of charging a battery having a metal negative electrode, wherein the method includes charging wherein the current at which the charging occurs is at least C/5, C/4, C/3, C/2, 1C, 2C, 3C, 4C, 5C, or 10C rate. In some examples, the current at which the charging occurs is at least C/5. In some examples, the current at which the charging occurs is at least C/4. In some examples, the current at which the charging occurs is at least C/3. In some examples, the current at which the charging occurs is at least C/2. In some examples, the current at which the charging occurs is at least 1C. In some examples, the current at which the charging occurs is at least 2C. In some examples, the current at which the charging occurs is at least 3C. In some examples, the current at which the charging occurs is at least 4C. In some examples, the current at which the charging occurs is at least 5C. In some examples, the current at which the charging occurs is at least 10C.

IV. Electrodes

In some examples, set forth herein is an electrochemical cell having a metal negative electrode made by the method set forth herein. In some examples, including any of the foregoing, the metal negative electrode is a lithium (Li) metal negative electrode. In some of these examples, the Li negative electrode is selected from Li foil or evaporated Li. In some of these examples, the Li negative electrode is deposited in the electrochemical cell during charging. In some examples, the thickness of the lithium metal negative electrode is 1 μm, 2 μm, 3 μm, 4 μm, 5 μm, 10 μm, 15 μm, 20 μm, 25 μm, 30 μm, 35, 40 μm, 45 μm, or 50 μm. In some examples, the thickness of the lithium metal negative electrode is about 1 μm, about 2 μm, about 3 μm, about 4 μm, about 5 μm, about 10 μm, about 15 μm, about 20 μm, about 25 μm, about 30 μm to 35, about 40 μm, about 45 μm, or about 50 μm. In some instances, the thickness of the lithium metal negative electrode is 1 μm. In some instances, the thickness of the lithium metal negative electrode is 2 μm. In some instances, the thickness of the lithium metal negative electrode is 3 μm. In some instances, the thickness of the lithium metal negative electrode is 4 μm. In some instances, the thickness of the lithium metal negative electrode is 5 μm. In some instances, the thickness of the lithium metal negative electrode is 6 μm. In some instances, the thickness of the lithium metal negative electrode is 7 μm. In some instances, the thickness of the lithium metal negative electrode is 8 μm. In some instances, the thickness of the lithium metal negative electrode is 9 µm. In some instances, the thickness of the lithium metal negative electrode is 10 µm. In some instances, the thickness of the lithium metal negative electrode is 15 µm. In some instances, the thickness of the lithium metal negative electrode is 20 µm. In some instances, the thickness of the lithium metal negative electrode is 25 µm. In some instances, the thickness of the lithium metal negative electrode is 30 µm. In some instances, the thickness of the lithium metal negative electrode is 35 µm. In some instances, the thickness of the lithium metal negative electrode is 40 µm. In some instances, the thickness of the lithium metal negative electrode is 45 µm. In some instances, the thickness of the lithium metal negative electrode is 50 µm.

In some examples, including any of the foregoing, the metal negative electrode is a sodium (Na) metal negative electrode. In other examples, the metal negative electrode is a zinc (Zn) metal negative electrode.

In some examples, set forth herein is an electrochemical cell having a solid electrolyte.

In some examples, set forth herein is an electrochemical cell having a positive electrode which is separated by the metal negative electrode by the solid electrolyte positioned there between.

During normal charging and discharging operations in a solid state electrochemical cell, ions closer to the interface of the solid electrolyte may conduct at a rate different from the ions which are closer to the negative electrode current collector. The imbalance in the rates of migration of metal ions within the metal negative electrode creates inhomogeneities at various surfaces in the metal negative electrode (e.g., depressions, cavities, pockets, bubbles, gaps and the like). These inhomogeneities can occur at the interface of the metal negative electrode current collector and the metal negative electrode or at the interface of the metal negative electrode and the solid electrolyte. Inhomogeneities may also arise within the metal negative electrode. The aforementioned inhomogeneities reduce ionic conduction through the metal negative electrode. The methods described herein allow for a redistribution of metal in the metal negative electrode thereby reducing or eliminating uneven concentrations of metal. The redistribution of metal in the metal negative electrode improves contact between the metal negative electrode current collector and the metal negative electrode as well as between the solid electrolyte and the metal negative electrode.

In one instance, during normal charging and discharging operations in a solid state Li-metal negative electrode electrochemical cell described herein lithium ions closer to the interface of the solid electrolyte may conduct at a rate different from the lithium ions which are closer to the negative electrode current collector. The imbalance in the rates of migration of lithium ions within the Li-metal negative electrode creates inhomogeneities at the various surfaces in the Li-metal negative electrode (e.g., depressions, cavities, pockets, bubbles, gaps and the like). These inhomogeneities can occur at the interface of the metal negative electrode current collector and the Li-metal negative electrode or at the interface of the Li-metal negative electrode and the solid electrolyte. Inhomogeneities may also arise within the Li-metal negative electrode. The aforementioned inhomogeneities reduce ionic conduction through the Li-metal negative electrode. The methods described herein allow for a redistribution of lithium in the Li-metal negative electrode thereby reducing or eliminating uneven concentrations of metal. The redistribution of lithium in a Li-metal negative electrode improves contact between the lithium metal negative electrode current collector and the Li-metal negative electrode as well as between the solid electrolyte and the Li-metal negative electrode.

Accordingly, in some examples, the metal negative electrode in an electrochemical cell described herein includes a smoother interface between the solid electrolyte and the metal negative electrode than otherwise would be present in the absence of charging the metal negative electrode according to a method set forth herein.

In some examples, the metal negative electrode includes an interface between the solid electrolyte and the metal negative electrode that has a surface roughness less than 1 µm.

In some examples, the metal negative electrode includes an interface between the solid electrolyte and the metal negative electrode that has a surface roughness less than 100 nm.

In some examples, the metal negative electrode includes an interface between the solid electrolyte and the metal negative electrode that has a surface roughness less than 10 nm.

Provided herein is a method for healing an electrochemical cell, the method comprising applying mechanical energy (e.g., ultrasonic vibrations) to a metal negative electrode in the electrochemical cell. In some embodiments, the electrochemical cell is in a battery. In some of such instances, the battery is in a vehicle (e.g., a car). In certain examples, the battery is in use in a car. Also contemplated are methods for healing a battery comprising applying mechanical energy to the battery.

V. Ultrasonic Vibration

In some examples, ultrasonic vibration is applied at a frequency of between 10-1000 kHz. In some examples, ultrasonic vibration is applied at a frequency of between 10-20 kHz. In some examples, ultrasonic vibration is applied at a frequency of between 20-30 kHz. In some examples, ultrasonic vibration is applied at a frequency of between 30-40 kHz. In some examples, ultrasonic vibration is applied at a frequency of between 40-50 kHz. In some examples, ultrasonic vibration is applied at a frequency of between 50-60 kHz. In some examples, ultrasonic vibration is applied at a frequency of between 60-70 kHz. In some examples, ultrasonic vibration is applied at a frequency of between 70-80 kHz. In some examples, ultrasonic vibration is applied at a frequency of between 80-90 kHz. In some examples, ultrasonic vibration is applied at a frequency of between 90-100 kHz. In some examples, ultrasonic vibration is applied at a frequency of between 100-120 kHz. In some examples, ultrasonic vibration is applied at a frequency of between 120-140 kHz. In some examples, ultrasonic vibration is applied at a frequency of between 140-160 kHz. In some examples, ultrasonic vibration is applied at a frequency of between 160-180 kHz. In some examples, ultrasonic vibration is applied at a frequency of between 180-200 kHz. In some examples, ultrasonic vibration is applied at a frequency of between 200-250 kHz. In some examples, ultrasonic vibration is applied at a frequency of between 250-300 kHz. In some examples, ultrasonic vibration is applied at a frequency of between 300-350 kHz. In some examples, ultrasonic vibration is applied at a frequency of between 350-400 kHz. In some examples, ultrasonic vibration is applied at a frequency of between 400-450 kHz. In some examples, ultrasonic vibration is applied at a frequency of between 450-500 kHz. In some examples, ultrasonic vibration is applied at a frequency of between 500-600 kHz. In some examples, ultrasonic vibration is applied at a frequency of between 600-700 kHz. In some examples, ultrasonic vibration is applied at a frequency of between 700-800 kHz. In some examples, ultrasonic vibration is applied at a frequency of between 800-900 kHz. In some examples, ultrasonic vibration is applied at a frequency of between 900-1000 kHz.

In some examples, the ultrasonic vibration power applied is between 0.1-1 mW/cm$^2$. In some examples, the ultrasonic vibration power applied is between 1-10 mW/cm$^2$. In some examples, the ultrasonic vibration power applied is between 10-100 mW/cm$^2$. In some examples, the ultrasonic vibration power applied is between 0.1-1 W/cm$^2$. In some examples, the ultrasonic vibration power applied is between 1-2 W/cm$^2$. In some examples, the ultrasonic vibration power applied is between 2-3 W/cm$^2$. In some examples, the ultrasonic vibration power applied is between 3-4 W/cm$^2$. In some examples, the ultrasonic vibration power applied is between 4-5 W/cm$^2$. In some examples, the ultrasonic vibration power applied is between 5-6 W/cm$^2$. In some examples, the ultrasonic vibration power applied is between 20-30 W/cm$^2$. In some examples, ultrasonic vibration power is applied of between 6-7 W/cm$^2$. In some examples, the ultrasonic vibration power applied is between 7-8 W/cm$^2$. In some examples, the ultrasonic vibration power applied is between 8-9 W/cm$^2$. In some examples, the ultrasonic vibration power applied is between 9-10 W/cm$^2$. In some examples, the ultrasonic vibration power applied is between 10-20 W/cm$^2$. In some examples, ultrasonic vibration is applied of between 30-40 W/cm$^2$. In some examples, the ultrasonic vibration power applied is between 40-50 W/cm$^2$.

VI. Systems

A. Electrochemical Cells with Ultrasonic Vibration Generators

As shown in FIG. 1, in some examples, set forth is an electrochemical cell (100) having a positive electrode (101), a solid electrolyte (102), and a metal negative electrode (103). In some examples, during charging, ultrasonic vibrations (104) are directed to the metal negative electrode. This ultrasonic vibration imparts a positive change in energy, i.e., ΔE, to the metal negative electrode. The increase in ΔE, due to the ultrasonic vibration, mimics a battery heated to elevated temperatures. This allows for the charging to occur at a temperature lower than it otherwise would have occurred at, and without the problems associated with low temperature. This allows for fast charging to occur at a temperature lower than it otherwise would have occurred at, and without the problems associated with low temperature. Due to the ultrasonic vibrations (104), the electrochemical cell (100) can be charged at lower temperature or higher power charging scenarios. For example, the battery could be charged at −30° C., −25° C., −20° C., −15° C., −10° C., −5° C., 0° C., 5° C., 10° C., 15° C., 20° C., 25° C., 30° C., 35° C., 40° C., or 45° C. At each of these temperatures, depending on the amount of ultrasonic vibration imparted to the metal negative electrode, the battery could be charged at rates from 0.1 mA/cm$^2$ to 20 mA/cm$^2$. At each of these temperatures, depending on the amount of ultrasonic vibration imparted to the metal negative electrode, the battery could be charged at C-rates from C/20 to 5C. At each of these temperatures, depending on the amount of ultrasonic vibration imparted to the metal negative electrode, the battery could be charged at E-rates from E/20 to 5E.

In some examples, the solid electrolyte protects the metal negative electrode (e.g., a Li metal negative electrode) from exposure to ambient conditions. In some examples, the solid electrolyte provides a barrier which separates any volatile solvents and/or polymers in the electrochemical cell from directly contacting the metal negative electrode (e.g., a Li metal negative electrode). In some example, the barrier is the seal that the electrolyte separator makes with the metal negative electrode (e.g., a Li metal negative electrode).

Due to the ultrasonic vibrations (104), the electrochemical cell (100) can improve (i.e., heal the negative electrode) the battery's lifetime and safety. For example, after cycling (i.e., charging-discharging) the electrochemical cell, the metal negative electrode may develop an irregular or uneven surface at the interface with the solid electrolyte. If left untreated, the irregular or uneven surface can result in Li dendrite formation. This Li dendrite formation, if not remedied, can result in an electrical short between the positive and negative electrodes. However, by applying ultrasonic vibrations to the metal negative electrode, before, during, or after charging the electrochemical cell, the metal negative electrode can be healed. This healed metal negative electrode possesses improved characteristics compared to the metal negative electrode before it is charged under ultrasonic vibration conditions. For example, the interface between the metal negative electrode and the solid electrolyte may be improved, made smoother, made less rough, and/or in made to have a greater direct contact. Between the metal negative electrode and the solid electrolyte.

Ultrasonic waves can be generated with exterior sources or through wave generators attached to battery cell or placed inside a battery cell. The generator, for example, may be a 28 kHz ultrasonic generator from STEMiNC SMUG100W28AE with two outputs (50 W directed to each output) (https://www.steminc.com/PZT/en/ultrasonic-generator-auto-energized-100 w-28-khz). The transducer, for example, may be a 28 kHz bolt clamped Langevin Transducer from STEMiNC SMBLTD45F28H (https://www-.steminc.com/PZT/en/bolt-clamped-langevin-transducer-28-khz). Other piezoelectric transducers may work as well, for example the Murata Electronics North America 7NB-41-1 (http://www.digikey.com/products/en/audio-products/buzzer-elements-piezo-benders/160?k=piezoelectric). The transducer was bolted to a CR2032 coin cell. A close coupling of the coin cell to the transducer is desired; therefore a gel such as an ultrasound gel might be used at the interface. The ultrasonic frequency may be from 0.5-5000 kHz, and the energy input may be from 1 mW/cm$^2$ to 100 W/cm$^2$ per cell cross-sectional area.

B. Coin Cells

Figure 2:
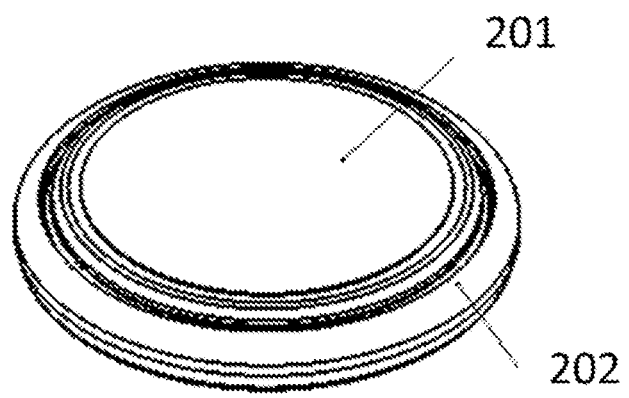
FIG. 2 shows a coin cell (202) having a metal negative electrode with a piezoelectric ultrasonic vibration generator (201) attached to an outer edge.

FIG. 2 shows a coin cell (202) having a metal negative electrode with a piezoelectric ultrasonic vibration generator (201) attached to an outer edge. This illustration is just one example of the way in which an ultrasonic vibration generator may be positioned with respect to a metal negative electrode. Other embodiments are contemplated by the instant disclosure.

C. Can Cells

Figure 3:
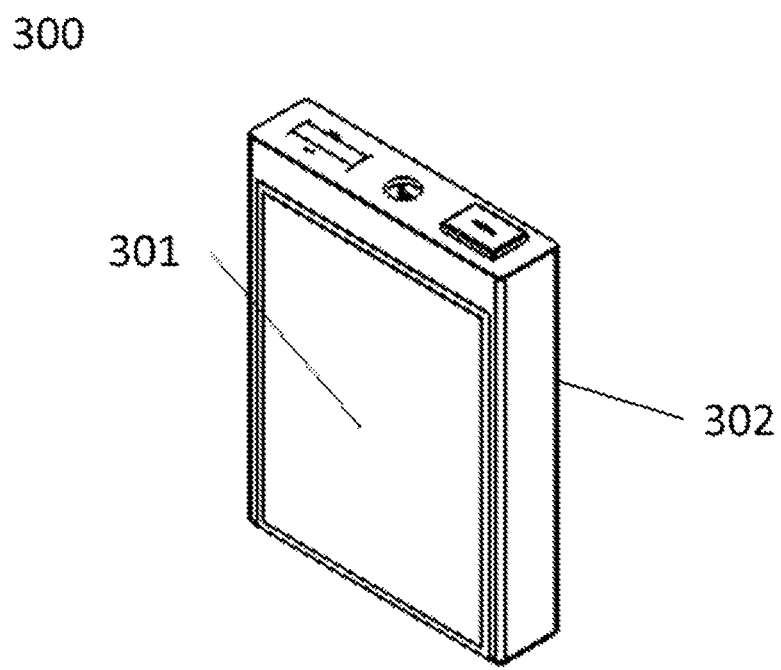
FIG. 3 shows a can cell (302) having a metal negative electrode with a piezoelectric ultrasonic vibration generator (301) attached to an outer edge.

FIG. 3 shows a can cell (302) having a metal negative electrode with a piezoelectric ultrasonic vibration generator (301) attached to an outer edge. This illustration is just one example of the way in which an ultrasonic vibration generator may be positioned with respect to a metal negative electrode. Other embodiments are contemplated by the instant disclosure.

D. Other Systems

In some examples, provided herein are systems for applying ultrasonic vibration to an electrochemical cell, or series of cells, wherein the ultrasonic vibration is applied by a device which is exterior to, or not already assembled with the electrochemical cells. For example, a car service station may include ultrasonic vibration instruments including but not limited to the instruments set forth herein. These ultrasonic vibration instruments may be used to repair an electric vehicle that is in need of a service. For example, if an electric vehicle had an electrochemical cell, or series of cells, as traction batteries, and if these cells were in need of an improvement with respect to a metal negative electrode, therein, then the electric vehicle would be charged, while at the service station, using the ultrasonic vibration instruments from the service station. The service station may regulate the temperature of the electric vehicle or its electrochemical cells or battery modules while charging and ultrasonically vibrating the electrochemical cells. In some examples, ultrasonic vibration is applied to a pouch cell. In some examples, ultrasonic vibration is applied to a pouch cell by a vibration apparatus outside of the pouch. In some examples, ultrasonic vibration is applied to a pouch cell by a vibration apparatus inside of the pouch. In further examples, ultrasonic vibration is applied to a pouch cell by a vibration apparatus inside and outside of the pouch. In further examples, ultrasonic vibration is applied to a pouch cell by a vibration apparatus placed in proximity to the pouch.

E. Diagnostics

The methods and systems herein disclose novel methods of charging a metal negative electrode in combination with the application of ultrasonic vibration to the metal negative electrode. During these methods, diagnostic measurements of the electrode or its electrochemical cell may be observed and/or recorded. During these methods, diagnostic measurements of the electrode or its electrochemical cell may be observed, recorded, transmitted, or received by or from a computer processor operatively coupled with computer memory.

In some methods, including any of the foregoing, the methods include measuring an electrochemical cell's voltage, current, impedance, resistance, pressure, temperature, evolved gases, or physical deformations. In certain methods, the methods include measuring the electrochemical cell's voltage. In certain methods, the methods include measuring the electrochemical cell's current. In certain methods, the methods include measuring the electrochemical cell's impedance. In certain methods, the methods include measuring the electrochemical cell's resistance. In certain methods, the methods include measuring the electrochemical cell's pressure. In certain methods, the methods include measuring the electrochemical cell's temperature. In certain methods, the methods include measuring or detecting gases which come from the electrochemical cell. In certain methods, the methods include measuring or observing physical deformations of the electrochemical cell. These physical deformations may include, but are not limited to, bulging, pitting, or bending of the electrochemical cell. These physical deformations may include, but are not limited to, pitting, tears, openings, or cracks in the electrochemical cell.

VII. Examples

Instruments were a 28 kHz ultrasonic generator from STEMiNC SMUG100W28AE (https://www.steminc.com/PZT/en/ultrasonic-generator-auto-energized-100 w-28-khz) with two outputs (50 W directed to each output) and a 28 kHz bolt clamped Langevin Transducer from STEMiNC SMBLTD45F28H (https://www.steminc.com/PZT/en/bolt-clamped-langevin-transducer-28-khz). Other piezoelectric transducers may work as well, for example the Murata Electronics North America 7NB-41-1 (http://www.digikey.com/products/en/audio-products/buzzer-elements-piezo-benders/160?k=piezoelectric).

Example 1

Figure 6:
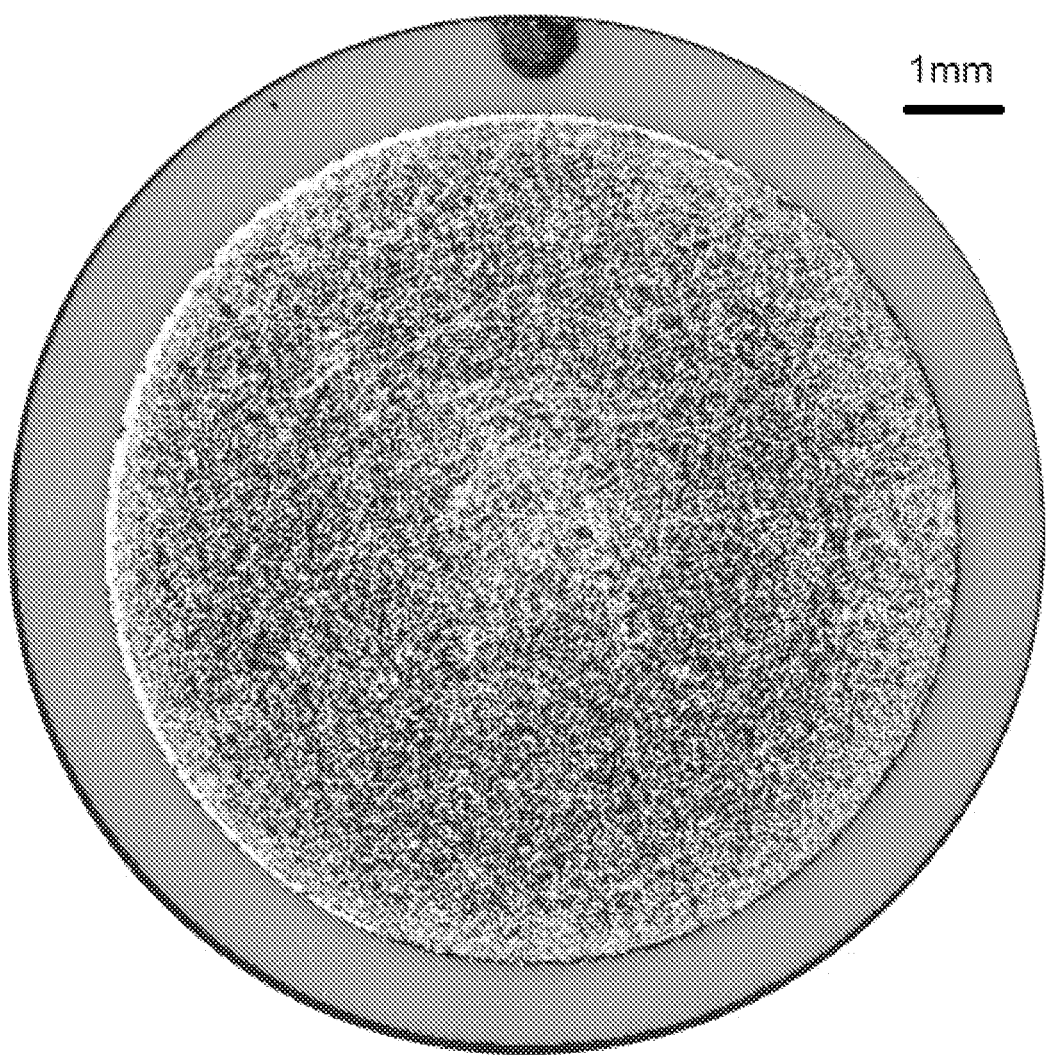
FIG. 6 shows lithium (Li) applied to a solid state separator before sonication.

A solid state electrolyte pellet of 1 mm thickness and 10 mm diameter had lithium evaporated on both sides with 9 mm diameters. See FIG. 6. The pellet was placed inside a 2032 coin cell with wave spring pressure configured to apply 100-500 psi on the lithium electrodes. The coin cells were placed on a hotplate fixture holding the coin cells at 45° C. and 1 mA/cm$^2$ of current was passed between the electrodes for approximately four hours in each direction to pass an equivalent thickness of 20 μm of lithium. This test was repeated 5 times on the device with different treatments between each cycle. After the first two cycles, the coin cell was placed at 100° C. for 24 hours. After the third and fourth cycle, the sample was placed against the ultrasonic horn for less than one second. After the fifth cycle, the sample was placed at 45° C. for 24 hours. During the fifth cycle, the sample failed due to insufficient recovery. It was concluded that the ultrasonic treatment was as effective as a treatment for 24 hours at 100° C., and more effective than a treatment for 24 hours at 45° C., at restoring the initial impedance of the cell and prolonging lifetime. The initial impedances and final impedances are shown in Table 1 below

| Cycle | Initial area-specific resistance [$\Omega cm^2$] |
| --- | --- |
| Cycle 1, 24 hours at 100° C. | 79.5 |
| Cycle 2, 24 hours at 100° C. | 82.5 |
| Cycle 3, sonication | 86.5 |
| Cycle 4, sonication | 83 |
| Cycle 5, 24 hours at 45° C. | 97 |

The effectiveness of the sonication is surprising in that it is much more time and energy efficient than a heat treatment at recovering the interface between lithium and the solid state electrolyte pellet.

Figure 7:
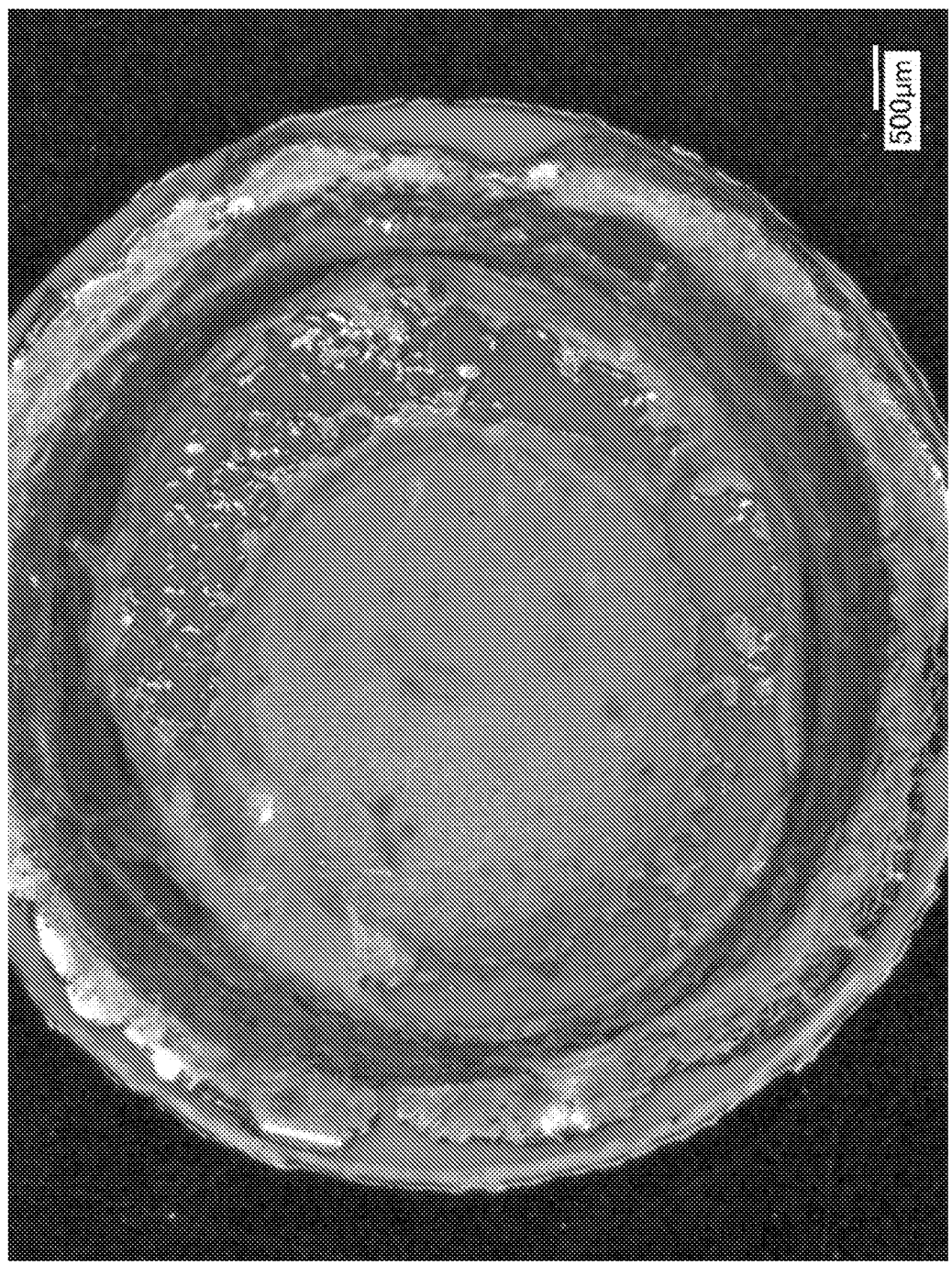
FIG. 7 shows Li applied to a solid state separator after sonication. The scale bar in FIG. 7 is 500 µm.

See FIG. 7 wherein the effect of applying ultrasonic vibration to a Li metal negative electrode is observed.

Example 2

A second coin cell was prepared as above. The procedure of treatment of the cell between electrochemical cycles was somewhat different, as shown in Table 2.

| Cycle | Initial area-specific resistance [$\Omega cm^2$] |
| --- | --- |
| Cycle 1, 24 hours at 100° C. | 82.5 |
| Cycle 2, 24 hours at 100° C. | 84.8 |
| Cycle 3, 24 hours at 45° C. | 87.5 |
| Cycle 4, 24 hours at 45° C. | 98 |
| Cycle 5, 24 sonication | 89.5 |

Figure 4:
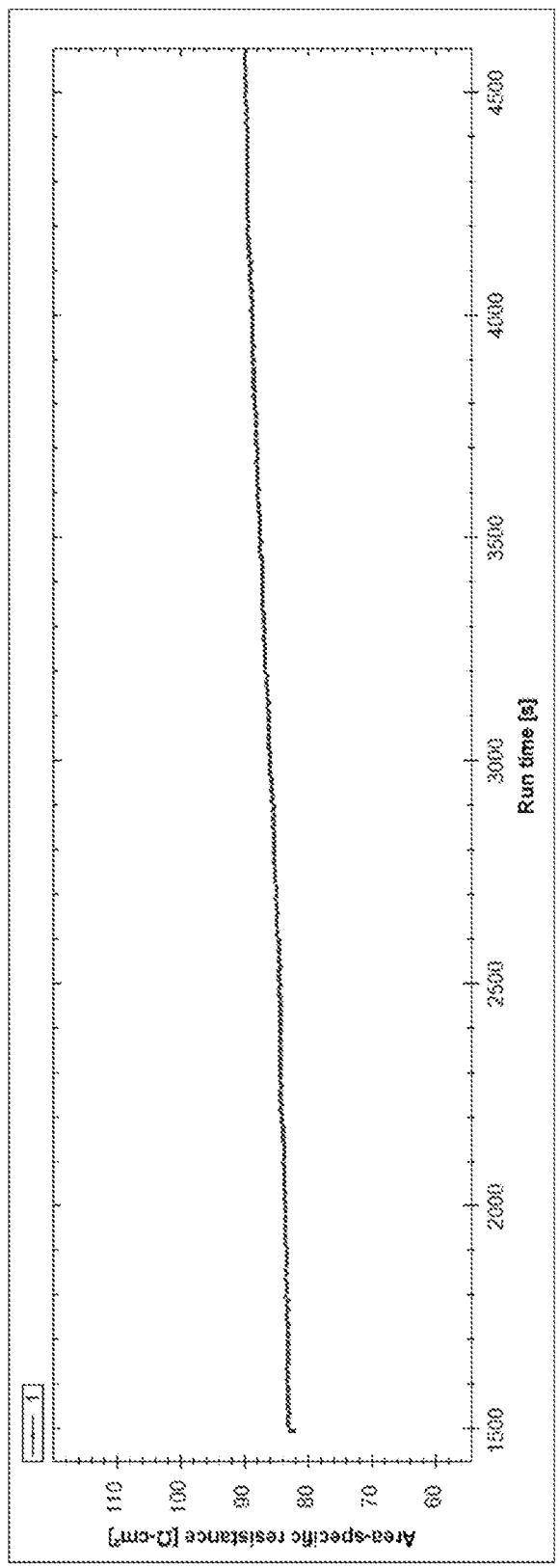
FIG. 4 shows electrochemical cycle 1 from Example 2.
Figure 5:
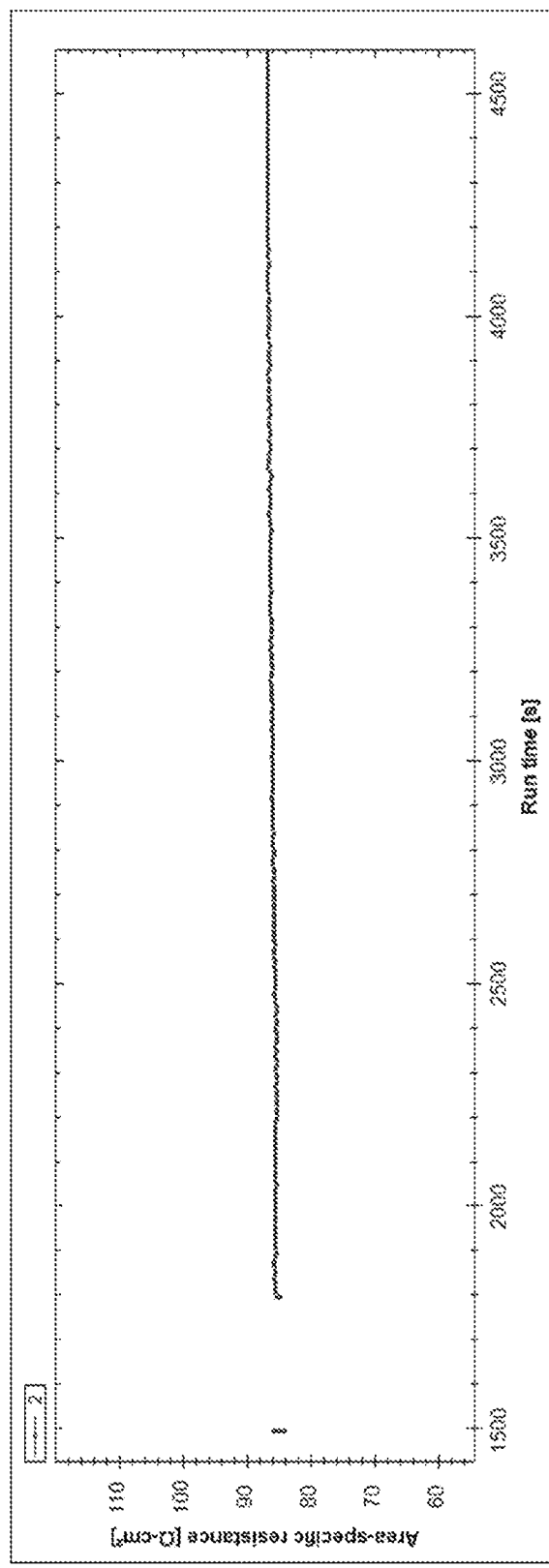
FIG. 5 shows electrochemical cycle 2 from Example 2.

The area-specific resistance of the entire cell during cycles 1 and 2 are shown in FIGS. 4-5, respectively.

This Example demonstrated localized heating of metal negative electrode without impacting electrochemical performance. This Example demonstrated that the probability of dendrite generation was reduced when using sonication periodically. This Example also demonstrated it was possible to "heal" a Li-metal negative electrode after a high discharge rate by reversing the growth in impedance of the cell.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A method for healing an electrochemical cell, the method comprising ultrasonically vibrating a metal negative electrode in the electrochemical cell, wherein the ultrasonic vibration is applied at a frequency of 20 kHz to 30 kHz, wherein the electrochemical cell is in a battery, wherein the electrochemical cell comprises a solid electrolyte in contact with the negative electrode, wherein the solid electrolyte is a lithium-stuffed garnet.

2. The method of claim 1, further comprising applying a pressure to the negative electrode.

3. The method of claim 1, wherein the battery is in a car.

4. The method of claim 1, wherein the battery is in use in a car.

* * * * *